US012383089B2

(12) United States Patent
Hori et al.

(10) Patent No.: US 12,383,089 B2
(45) Date of Patent: Aug. 12, 2025

(54) ELECTRIC KETTLE AND POWER SUPPLY UNIT

(71) Applicant: MAKITA CORPORATION, Anjo (JP)

(72) Inventors: Atsushi Hori, Anjo (JP); Yasuyuki Fujimoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 882 days.

(21) Appl. No.: 17/533,726

(22) Filed: Nov. 23, 2021

(65) Prior Publication Data

US 2022/0167775 A1     Jun. 2, 2022

(30) Foreign Application Priority Data

Dec. 1, 2020    (JP) .................................. 2020-199410

(51) Int. Cl.
     *A47J 27/21*          (2006.01)
     *H05B 1/02*           (2006.01)

(52) U.S. Cl.
     CPC ..... *A47J 27/2105* (2013.01); *A47J 27/21166* (2013.01); *H05B 1/0202* (2013.01); *H05B 1/0269* (2013.01); *H05B 2213/05* (2013.01)

(58) Field of Classification Search
     CPC .................. A47J 31/005; A47J 27/2105; A47J 27/21083; A47J 27/21166; A47J 27/212; A47J 27/004; A47J 27/21; A47J 27/21008; A47J 27/21158; A47J 27/21175; A47J 27/62; A47J 31/505; A47J 27/0817;

(Continued)

(56) References Cited

U.S. PATENT DOCUMENTS

| 2006/0207986 A1* | 9/2006 | Brown | ................ A47J 27/004 |
| | | | 219/442 |
| 2009/0084270 A1* | 4/2009 | Pinheiro | ............... A47J 31/005 |
| | | | 99/280 |

(Continued)

FOREIGN PATENT DOCUMENTS

| CN | 110123140 A | * | 8/2019 |
| CN | 112006536 A | * | 12/2020 |

(Continued)

OTHER PUBLICATIONS

English translation of CN-112006536-A (Year: 2020).*

(Continued)

*Primary Examiner* — Chris Q Liu
(74) *Attorney, Agent, or Firm* — Oliff PLC

(57) ABSTRACT

An electric kettle has a kettle body and a power supply unit that is configured to supply power to the kettle body. The power supply unit has a power supply base, a mounting unit and a first detection part. The power supply base is configured such that the kettle body is placed on top thereof, and has a power supply connection part that is configured to be electrically removably connected to a power receiving connection part. The mounting unit is configured such that a battery pack is removably coupled thereto as an external power source for supplying power to a heating part via the power supply connection part and the power receiving connection part. The first detection part is configured to detect that the power supply unit is on a plane.

17 Claims, 24 Drawing Sheets

(58) Field of Classification Search
CPC .... A47J 27/088; A47J 27/10; A47J 27/21191; A47J 27/21091; A47J 27/21041; A47J 27/21141; A47J 27/21025; A47J 31/053; A47J 31/057; A47J 31/18; A47J 31/20; A47J 31/4403; A47J 31/54; A47J 31/4439
USPC .......................... 99/279, 280, 281, 330, 403
See application file for complete search history.

(56) References Cited

U.S. PATENT DOCUMENTS

| | | | |
|---|---|---|---|
| 2011/0240624 A1 | 10/2011 | Zhang et al. | |
| 2012/0091117 A1* | 4/2012 | Cheng | A47J 27/2105 219/385 |
| 2013/0187461 A1 | 7/2013 | Goto et al. | |
| 2016/0374500 A1* | 12/2016 | Bugatti | A47J 27/21141 219/435 |
| 2017/0098949 A1* | 4/2017 | Goto | A47J 31/005 |

FOREIGN PATENT DOCUMENTS

| | | |
|---|---|---|
| JP | S4920149 U | 2/1974 |
| JP | 2008-532703 A | 8/2008 |
| JP | 2010-082382 A | 4/2010 |
| JP | 2012-080990 A | 4/2012 |
| JP | 2012-139461 A | 7/2012 |
| WO | 2018/074355 A1 | 4/2018 |

OTHER PUBLICATIONS

English translation of CN-110123140-A (Year: 2019).*
Mar. 12, 2024 Office Action issued in Japanese Patent Application No. 2020-199410.
U.S. Appl. No. 17/533,685, filed Nov. 23, 2021 in the name of Atsushi Hori et al.
Mar. 18, 2025 Office Action issued in Japanese Patent Application No. 2021-134628.
May 29, 2025 Office Action issued in Chinese Patent Application No. 202111445731.3.

* cited by examiner

【FIG. 1】
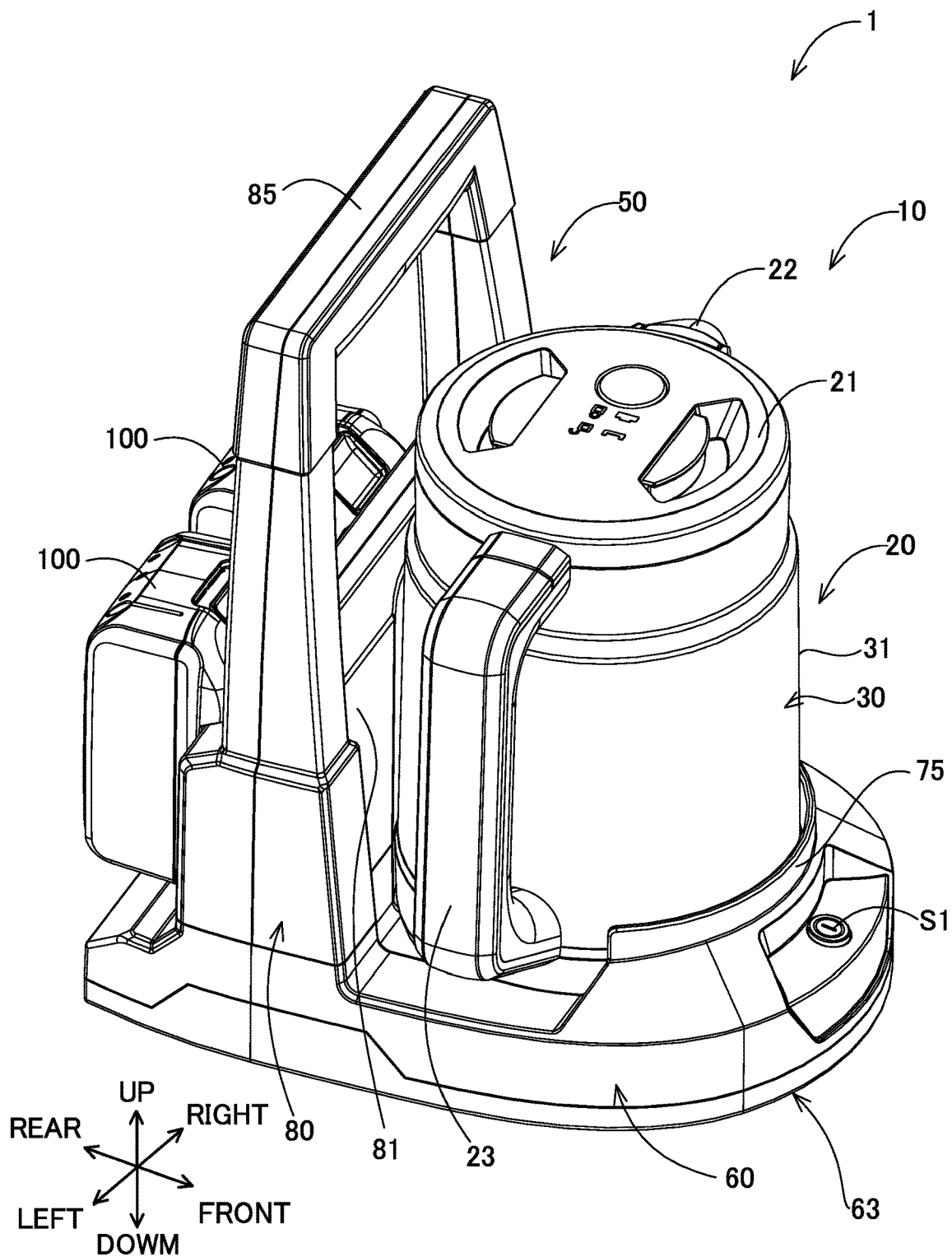

[FIG. 2]
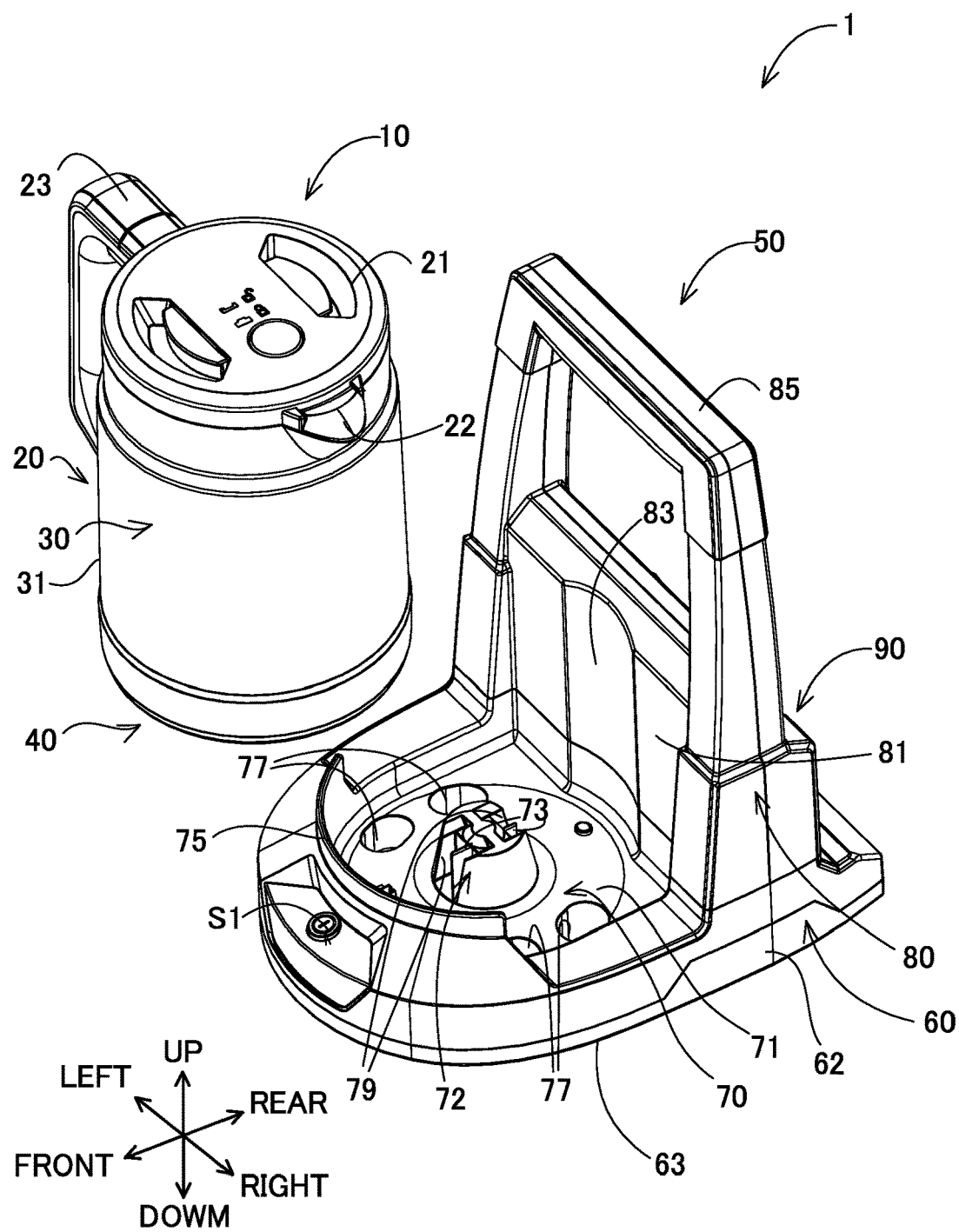

【FIG. 3】
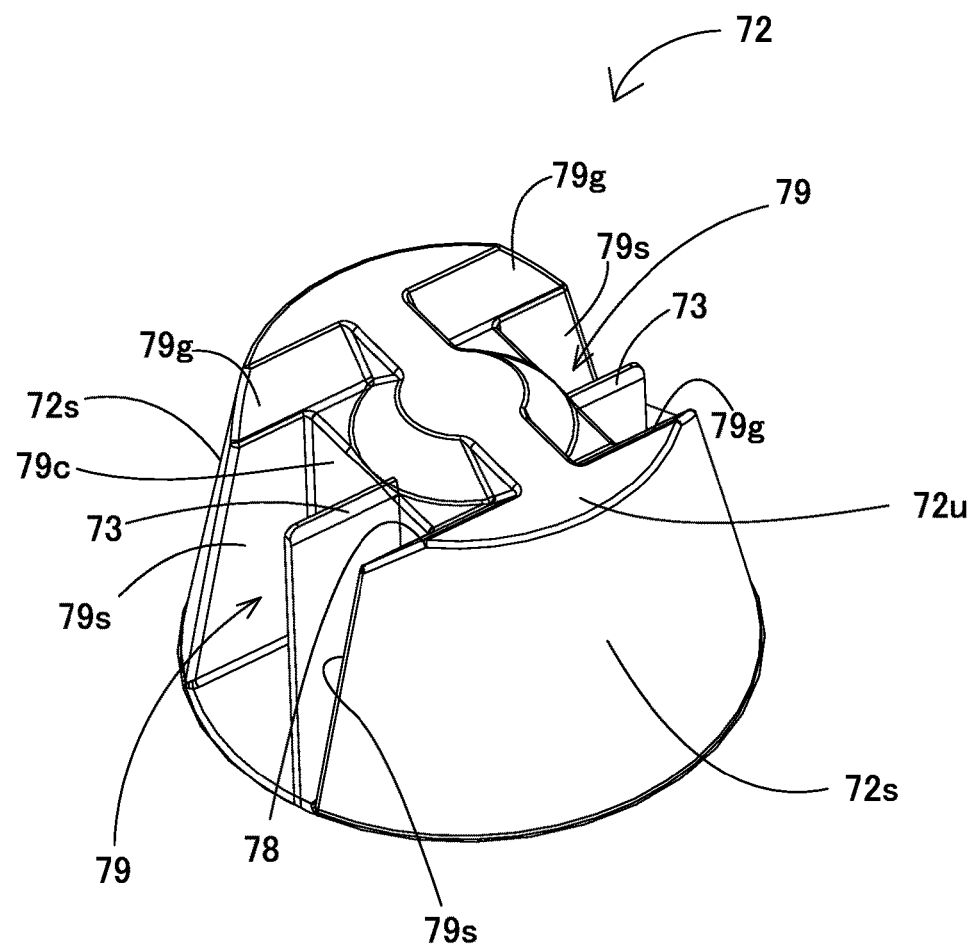

【FIG. 4】
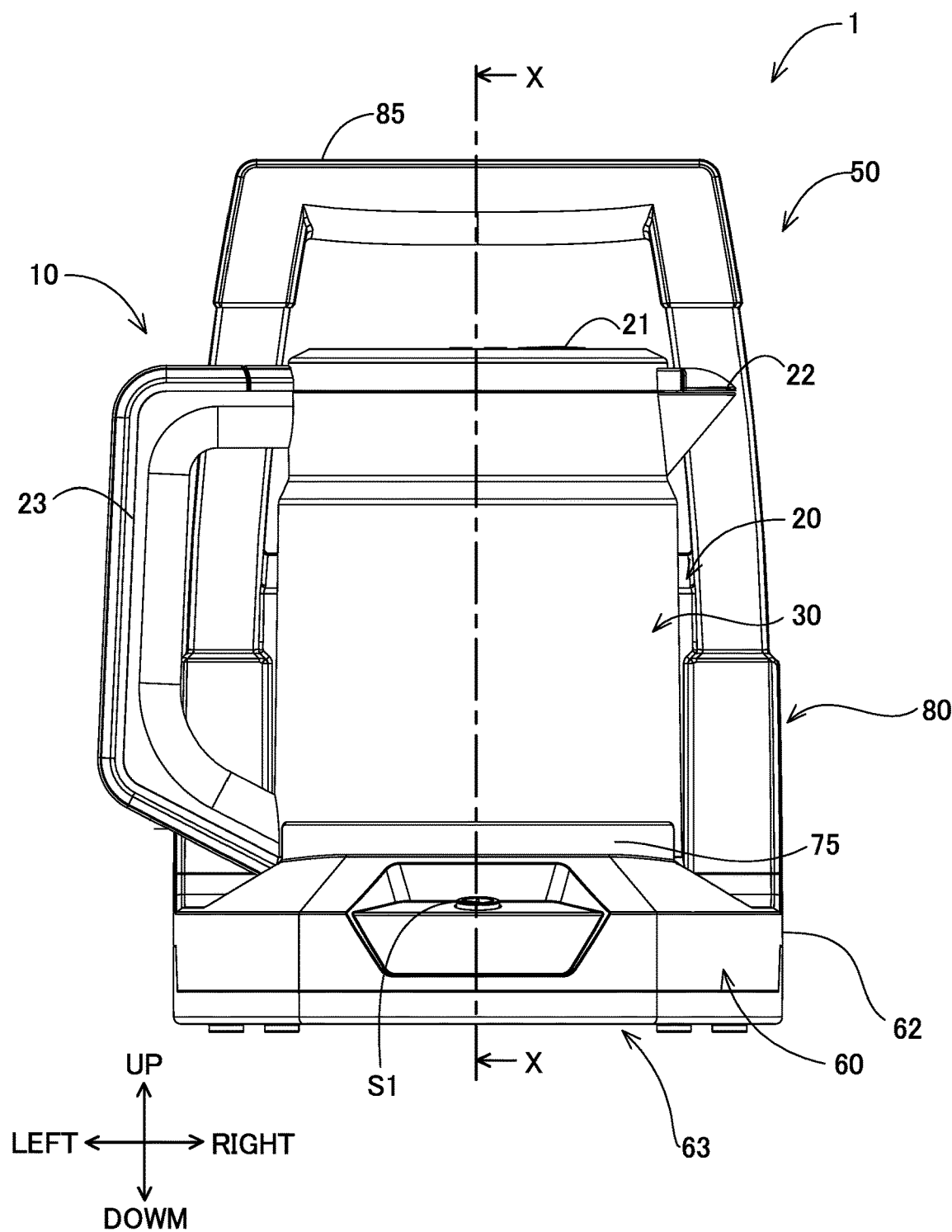

【FIG. 5】
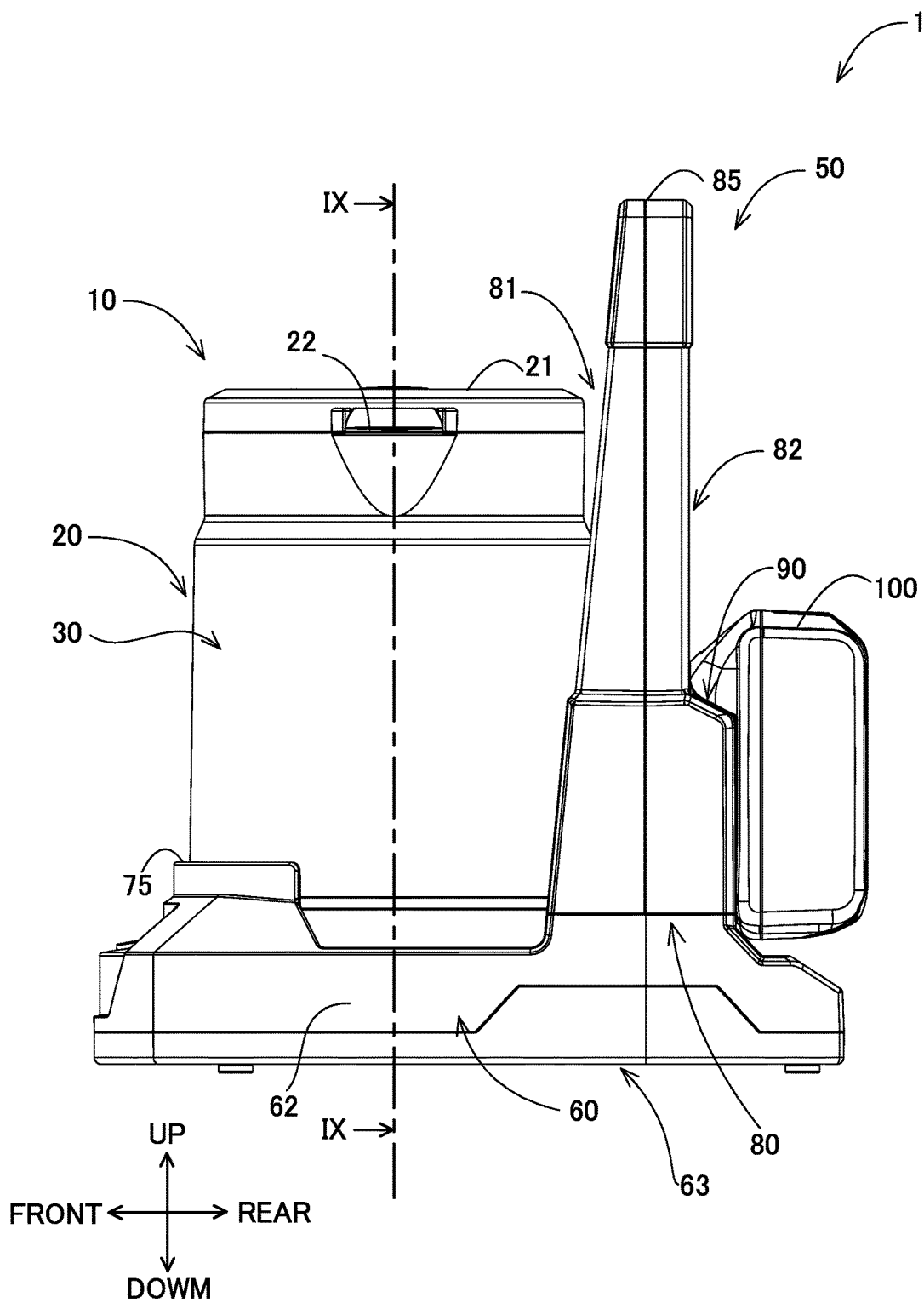

【FIG. 6】
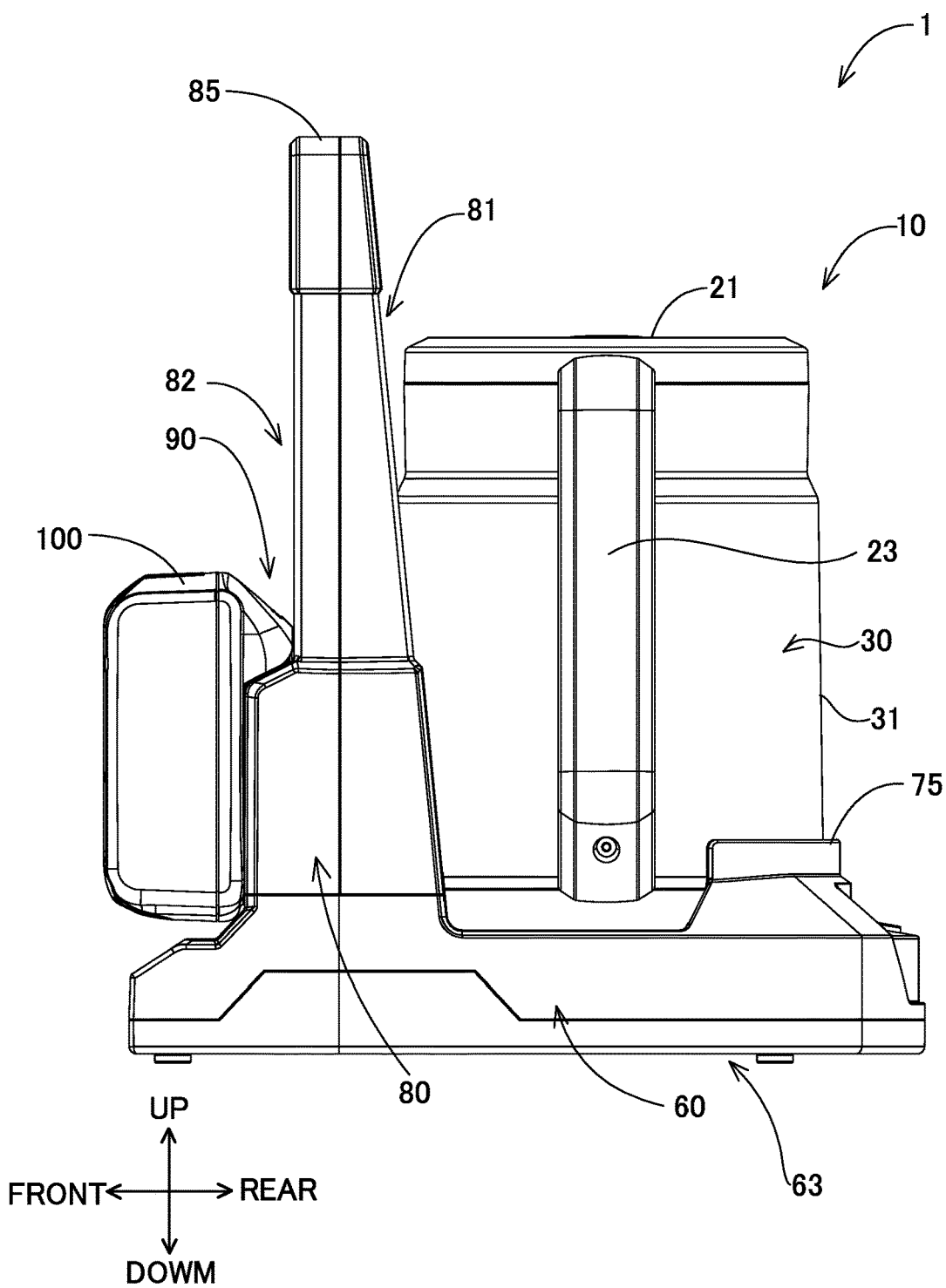

[FIG. 7]
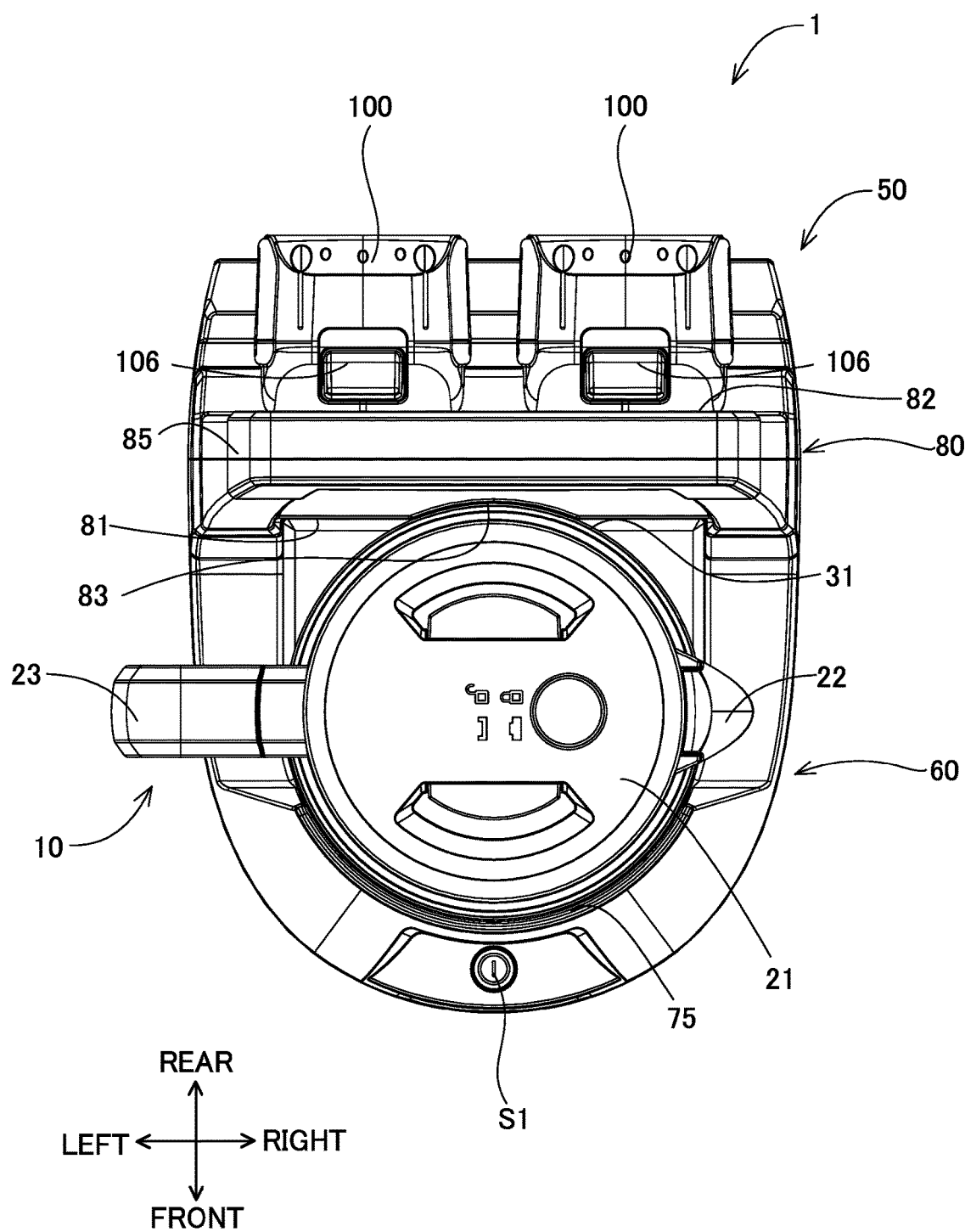

[FIG. 8]
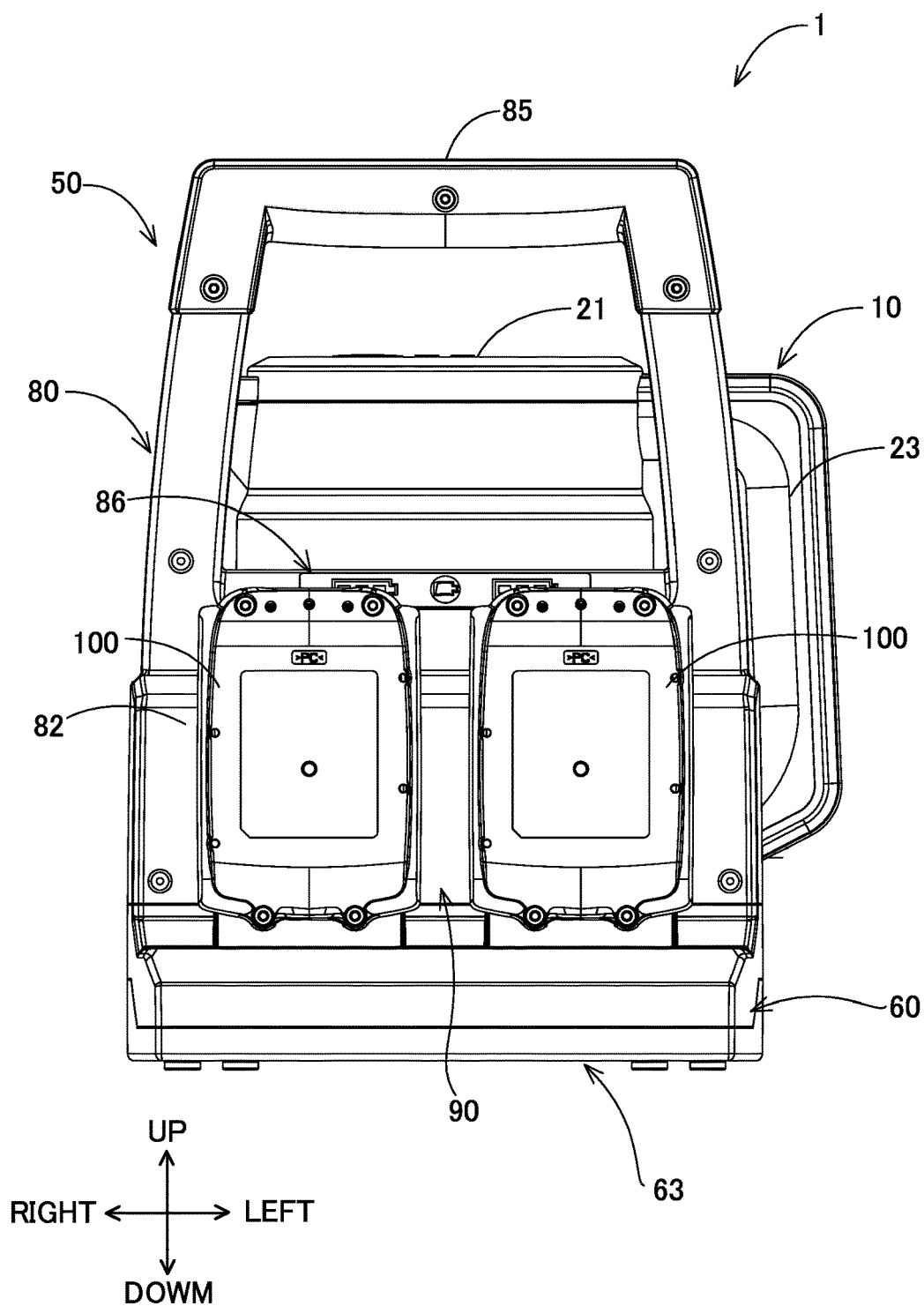

[FIG. 9]
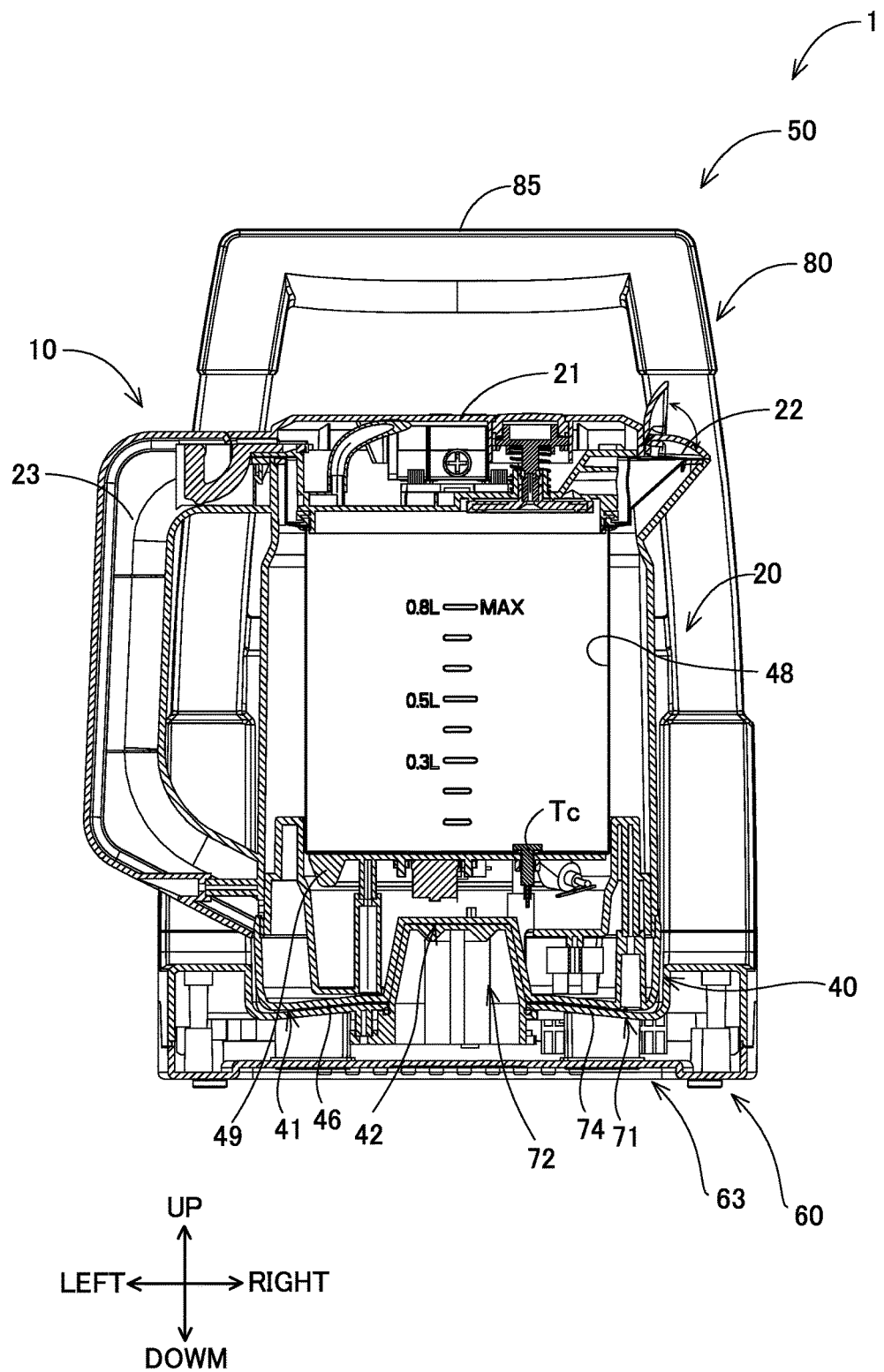

[FIG. 10]
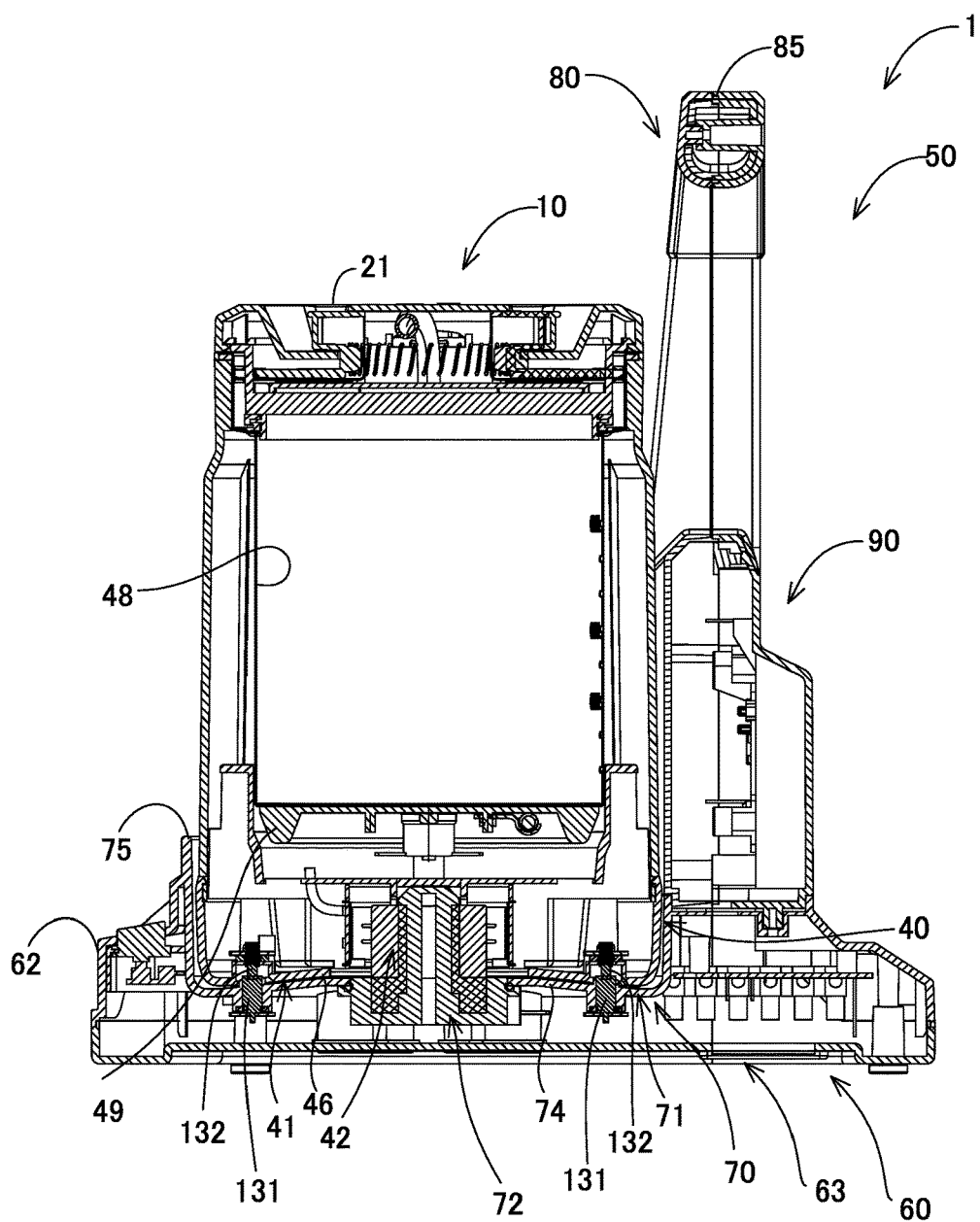
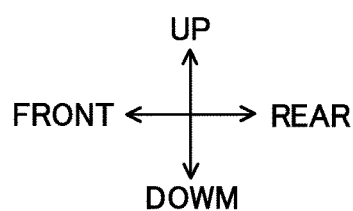

[FIG. 11]
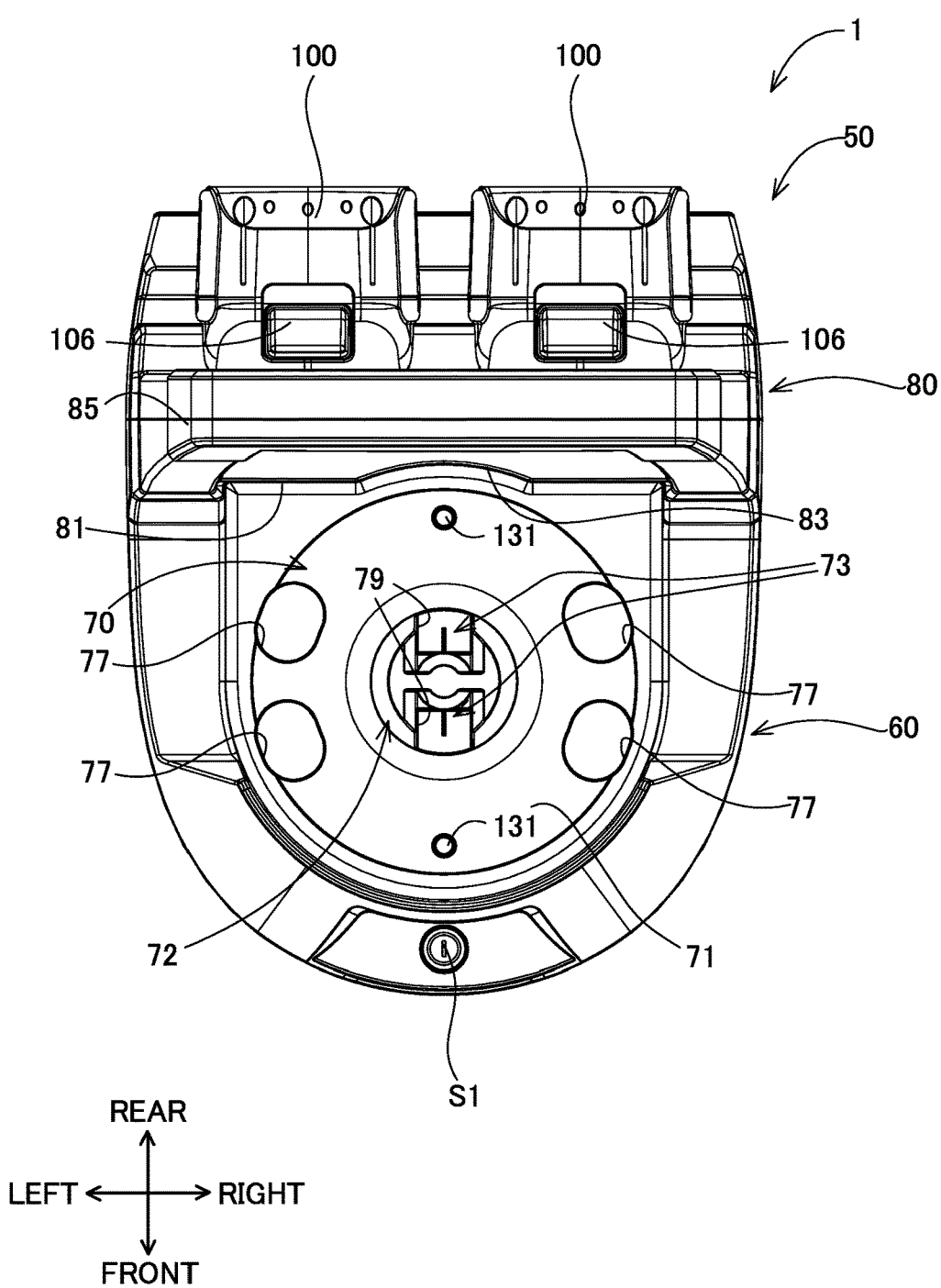

[FIG. 12]
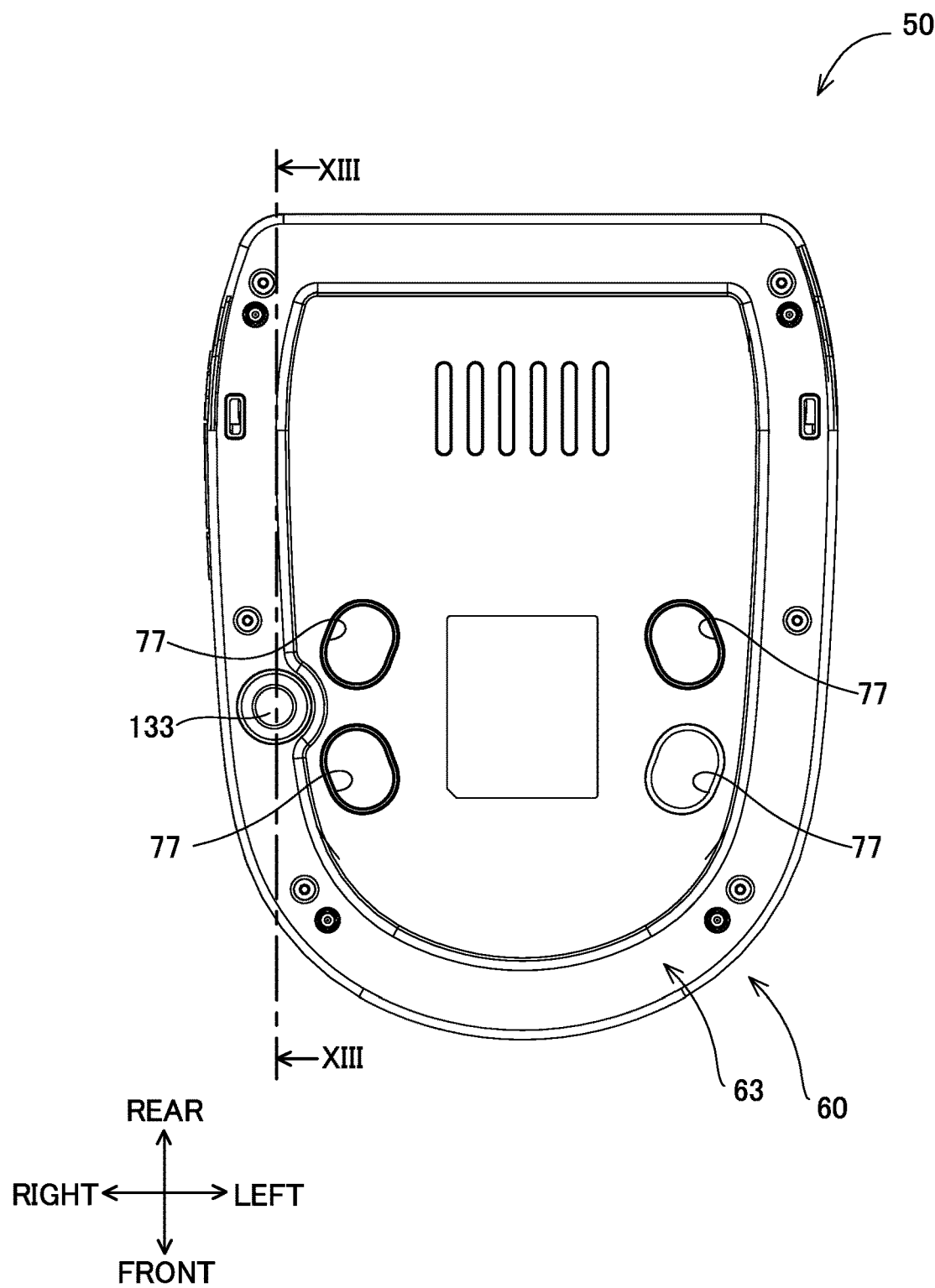

[FIG. 13]
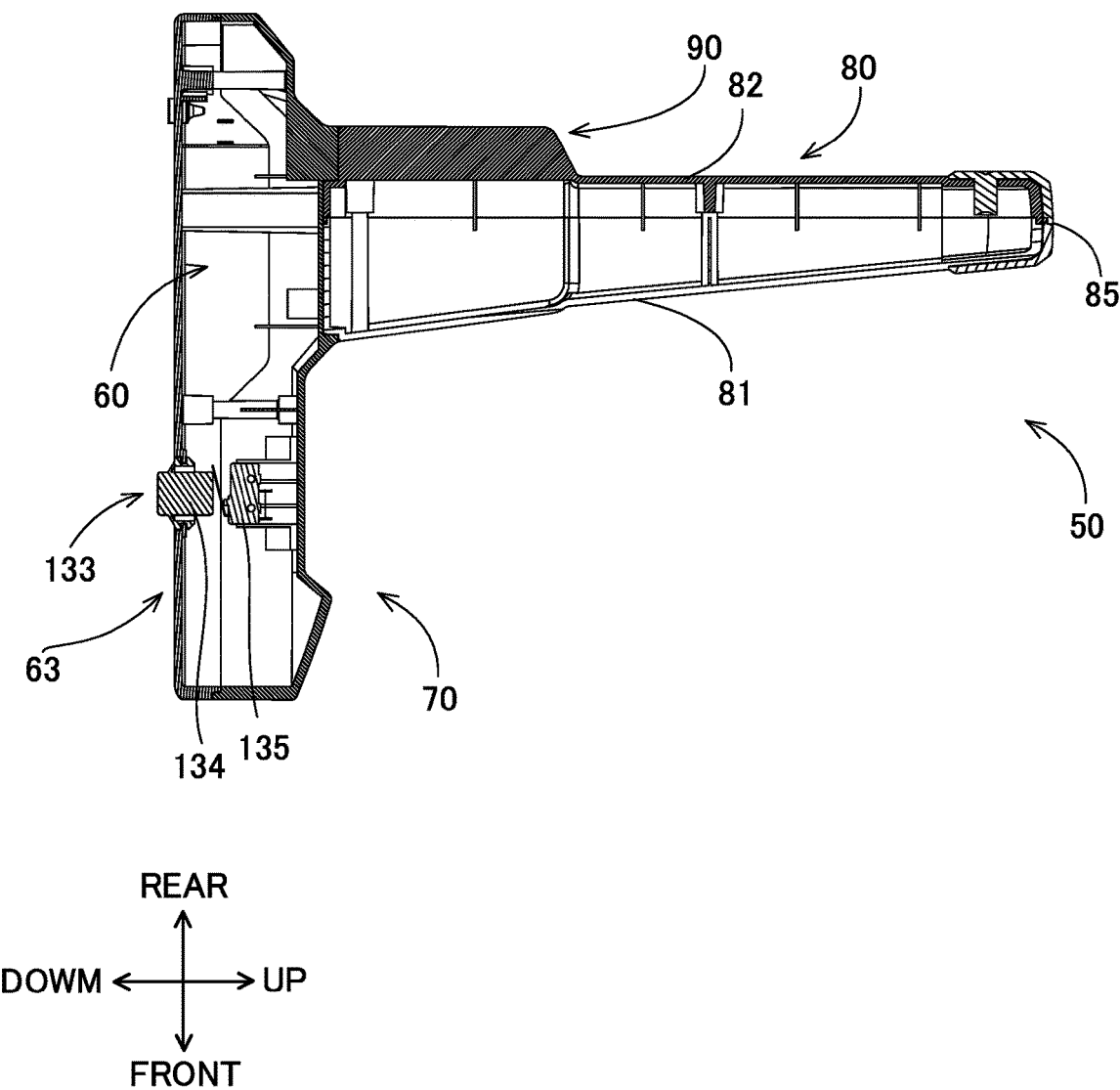

[FIG. 14]
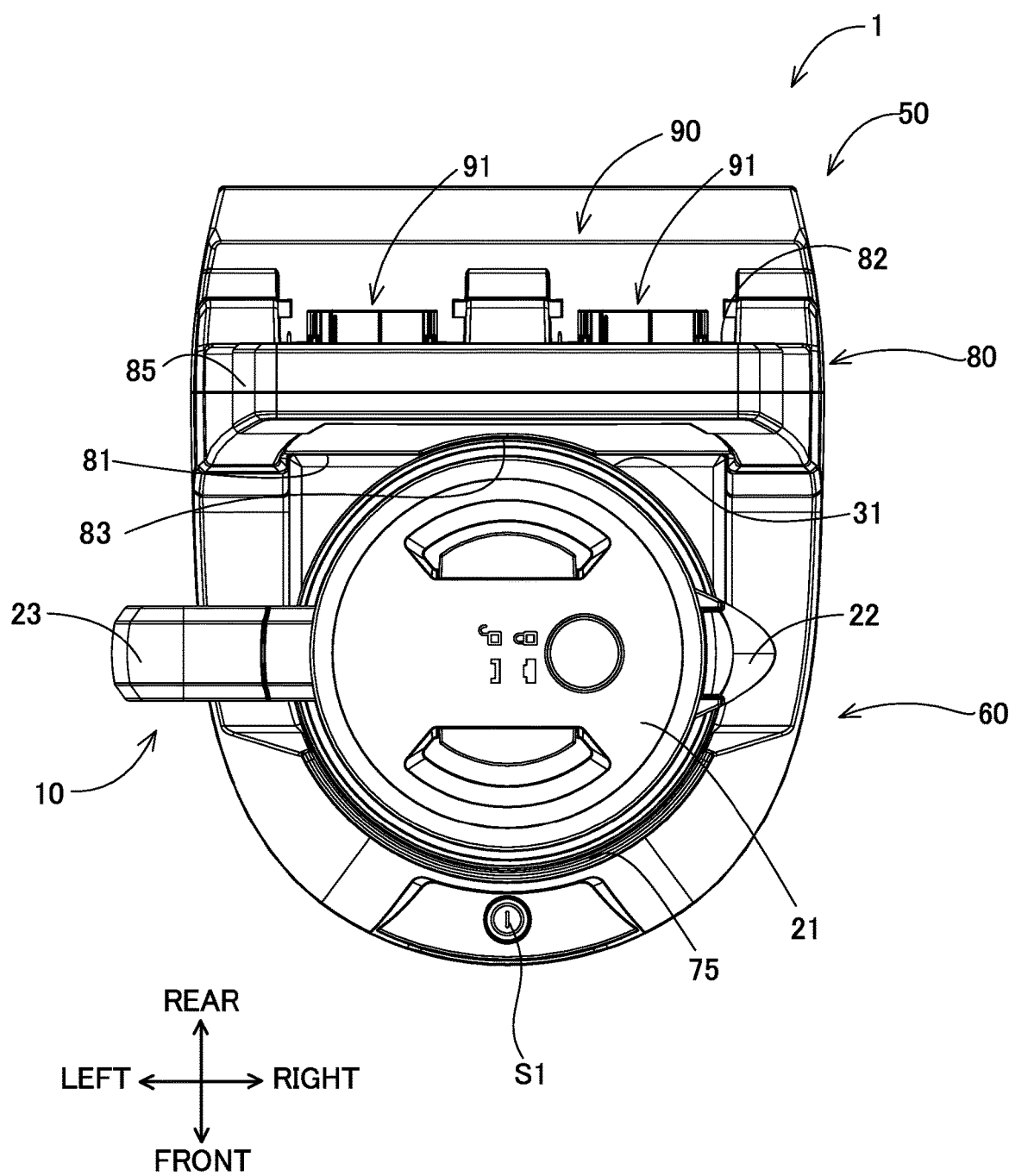

[FIG. 15]
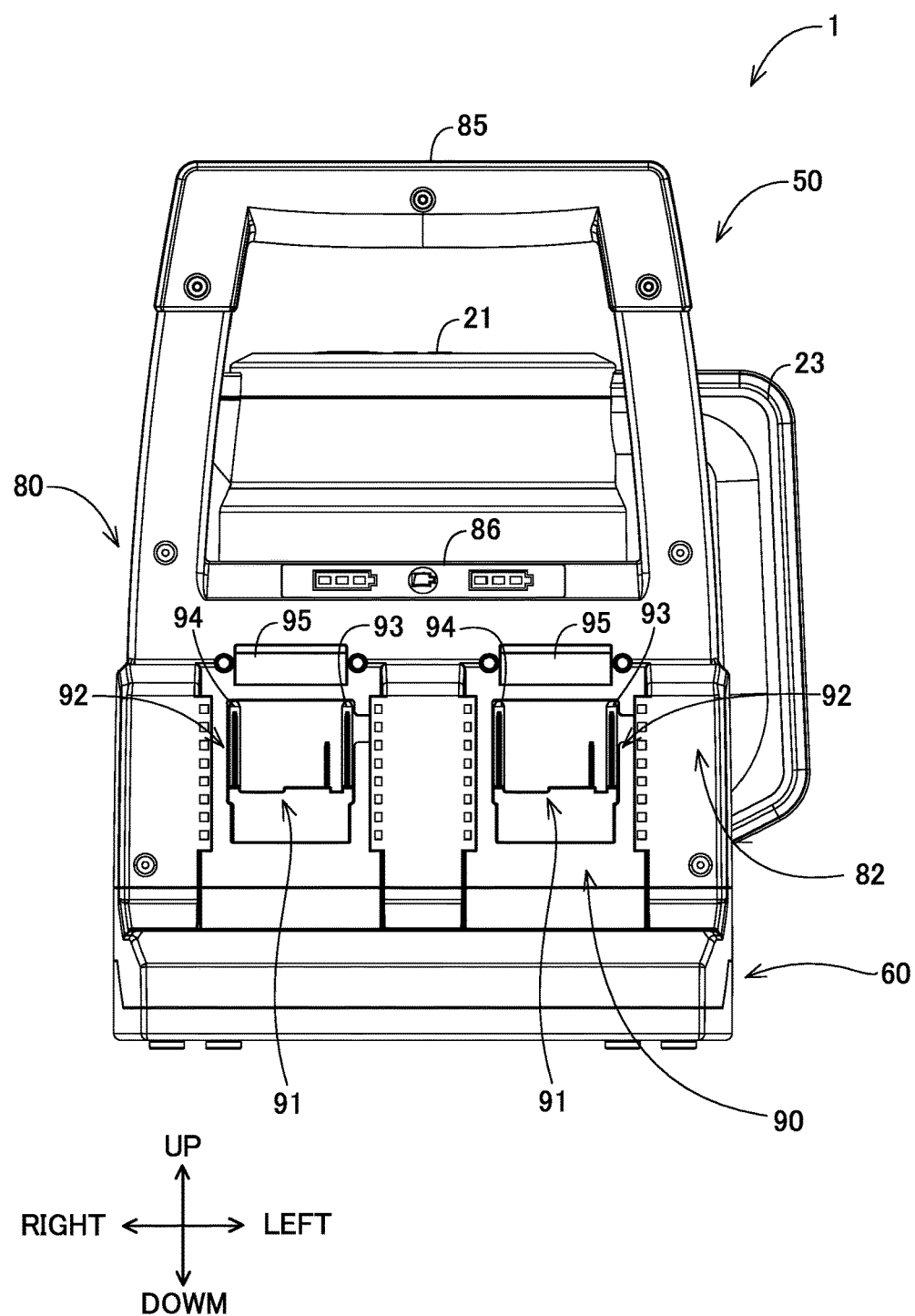

【FIG. 16】
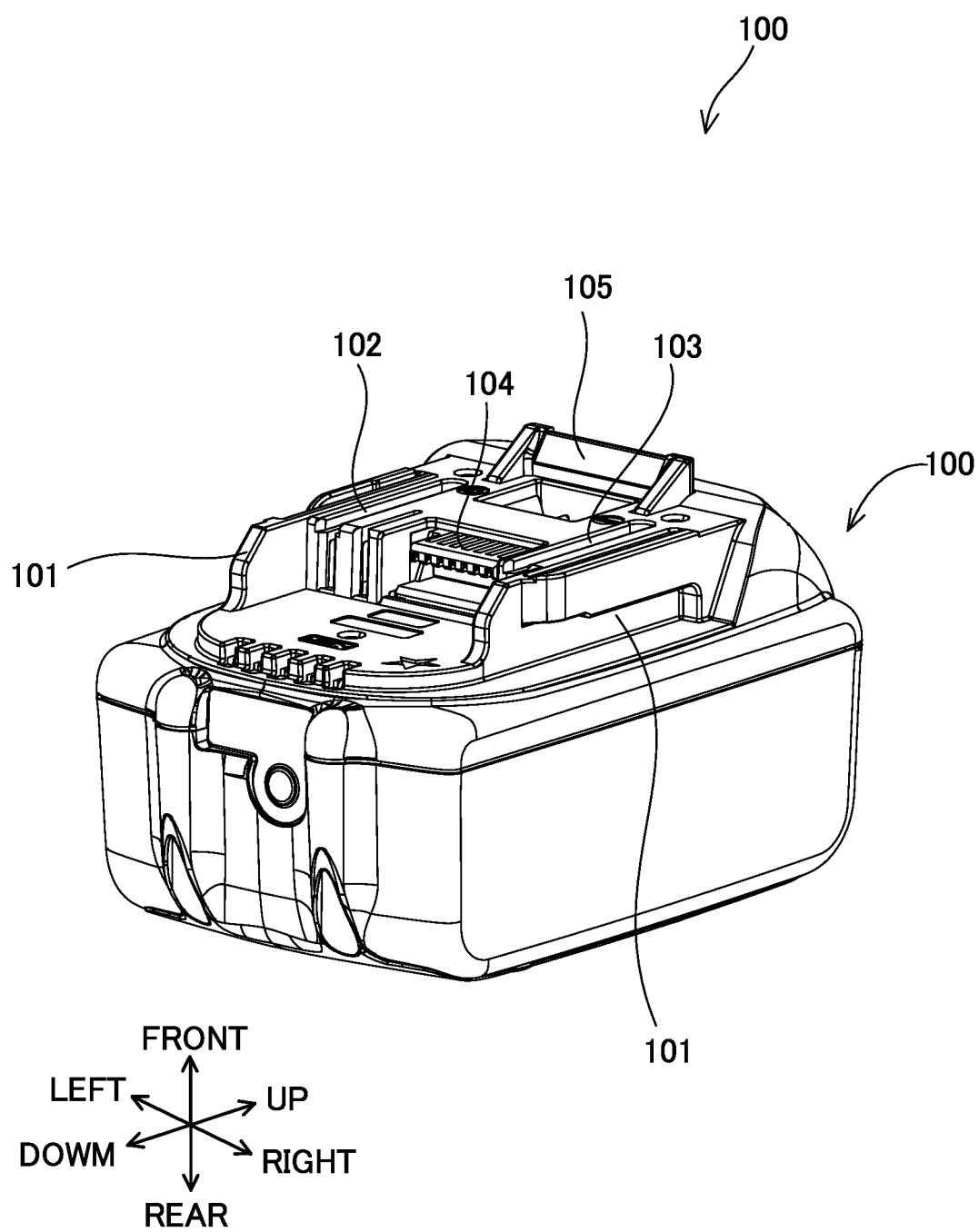

【FIG. 17】
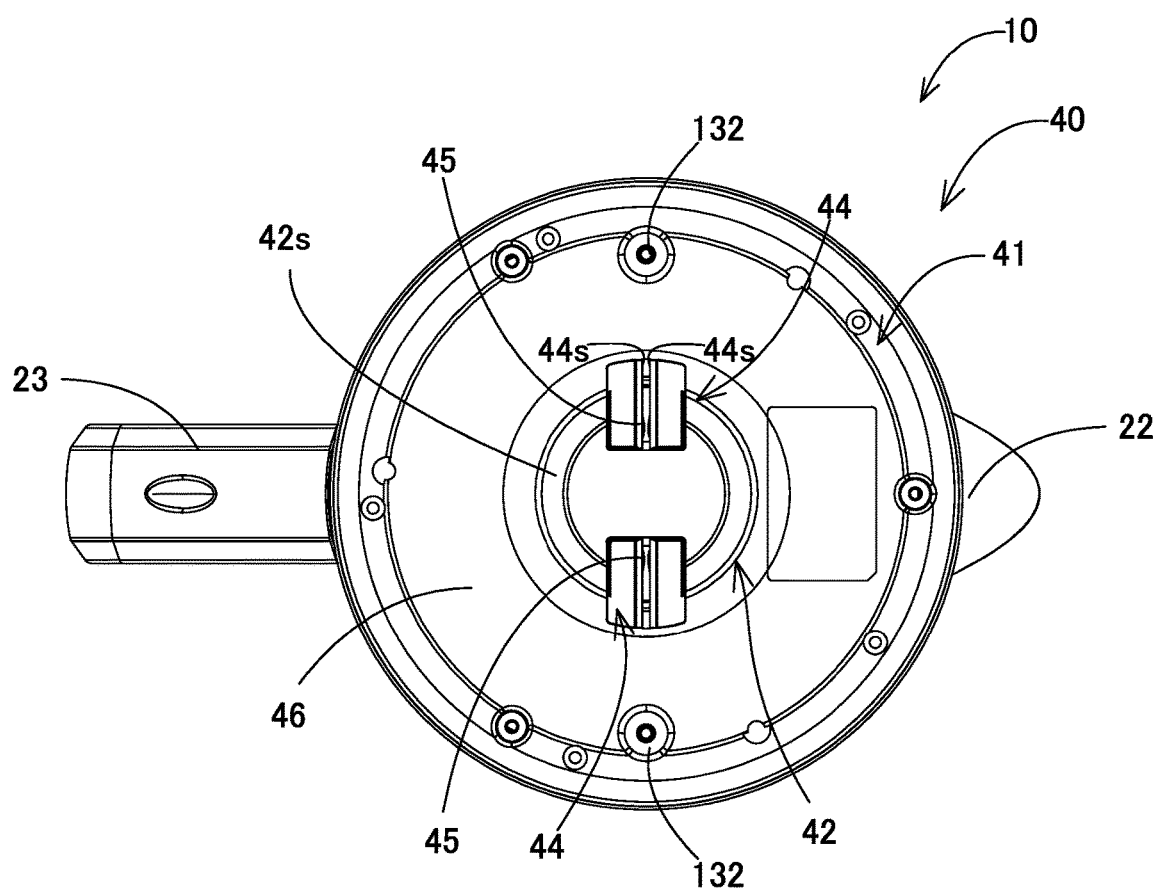
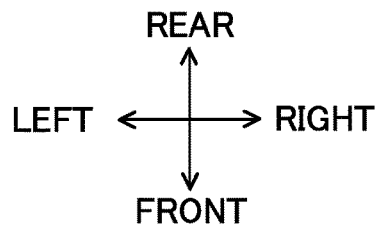

[FIG. 18]
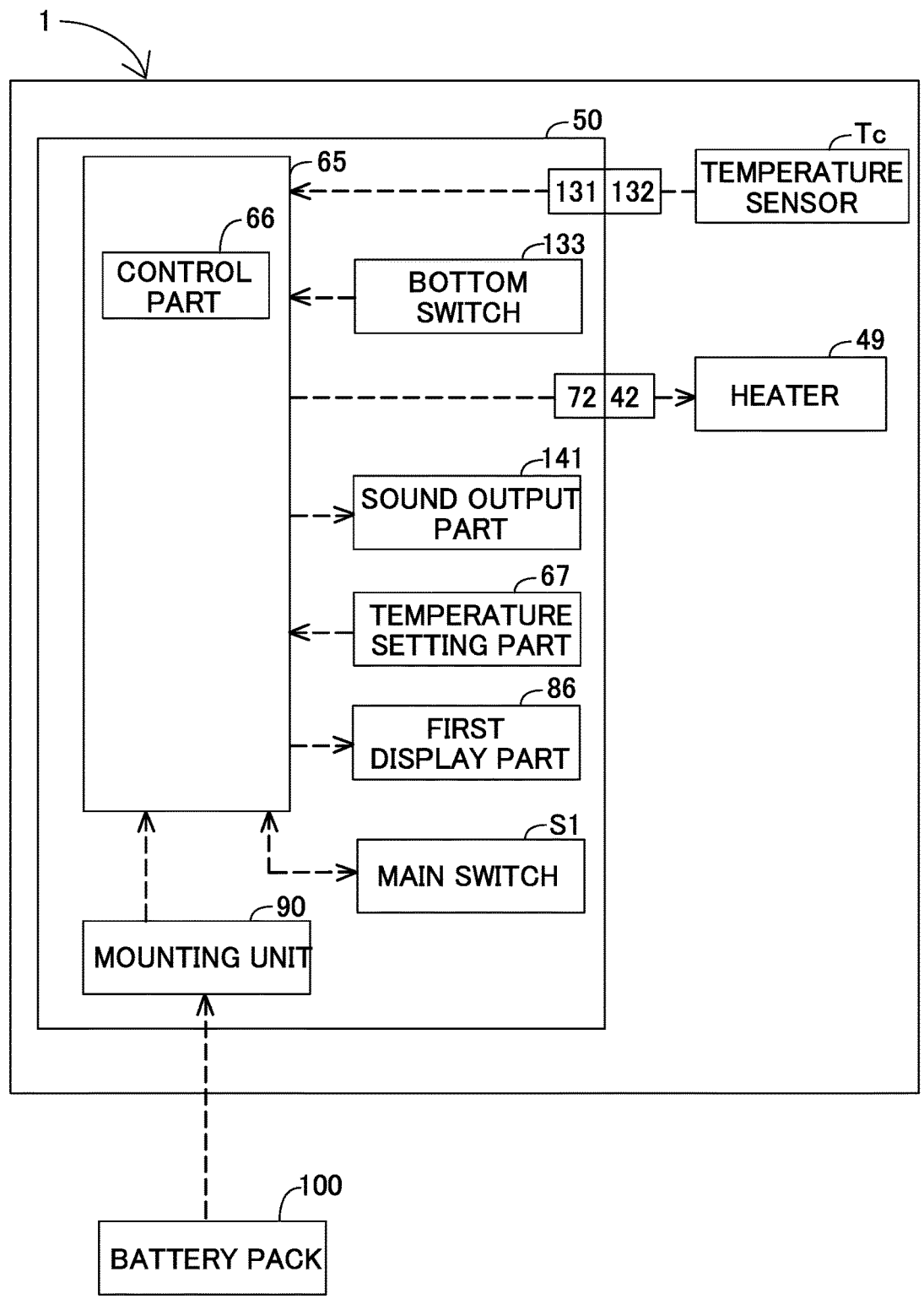

[FIG. 19]
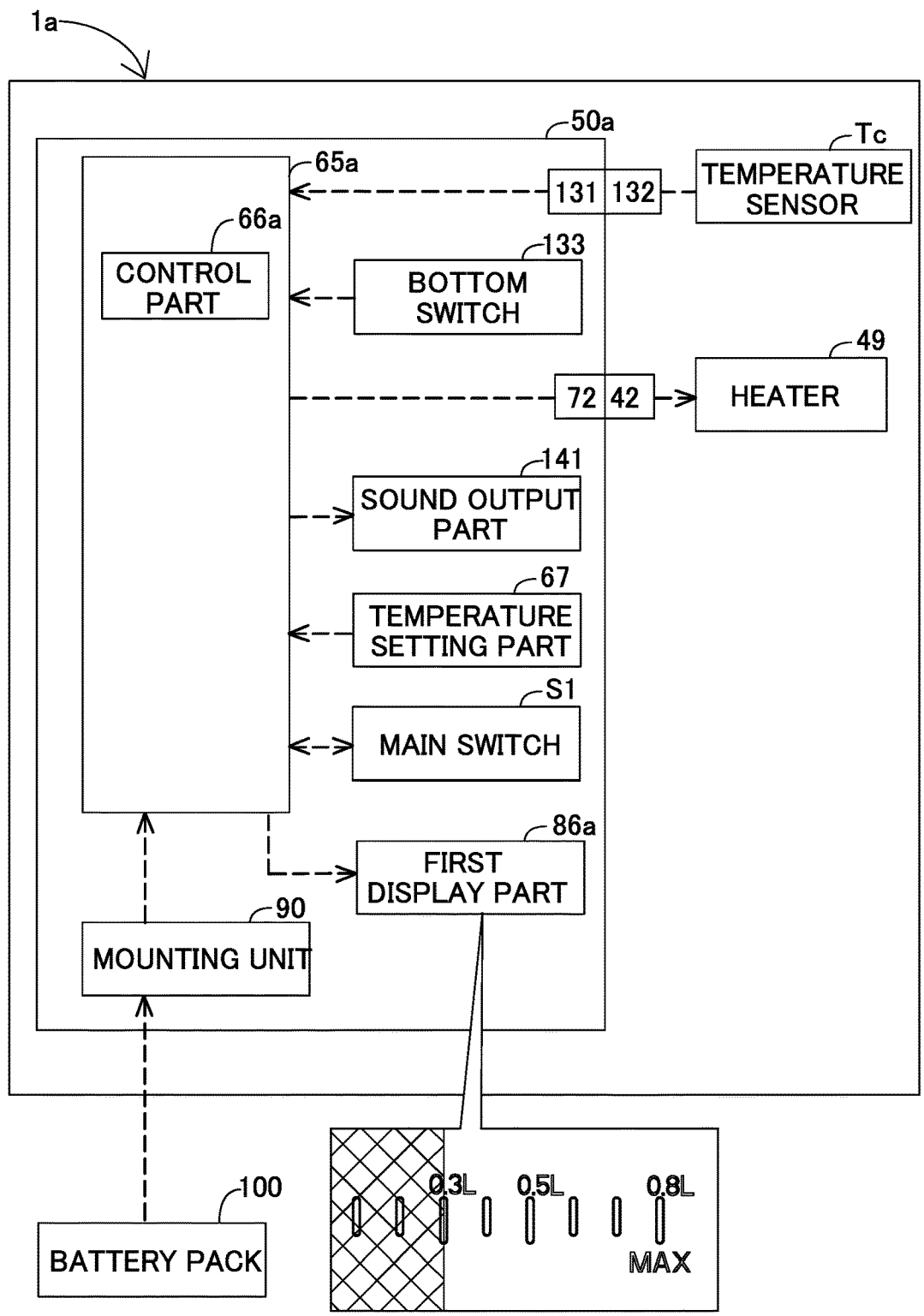

[FIG. 20]
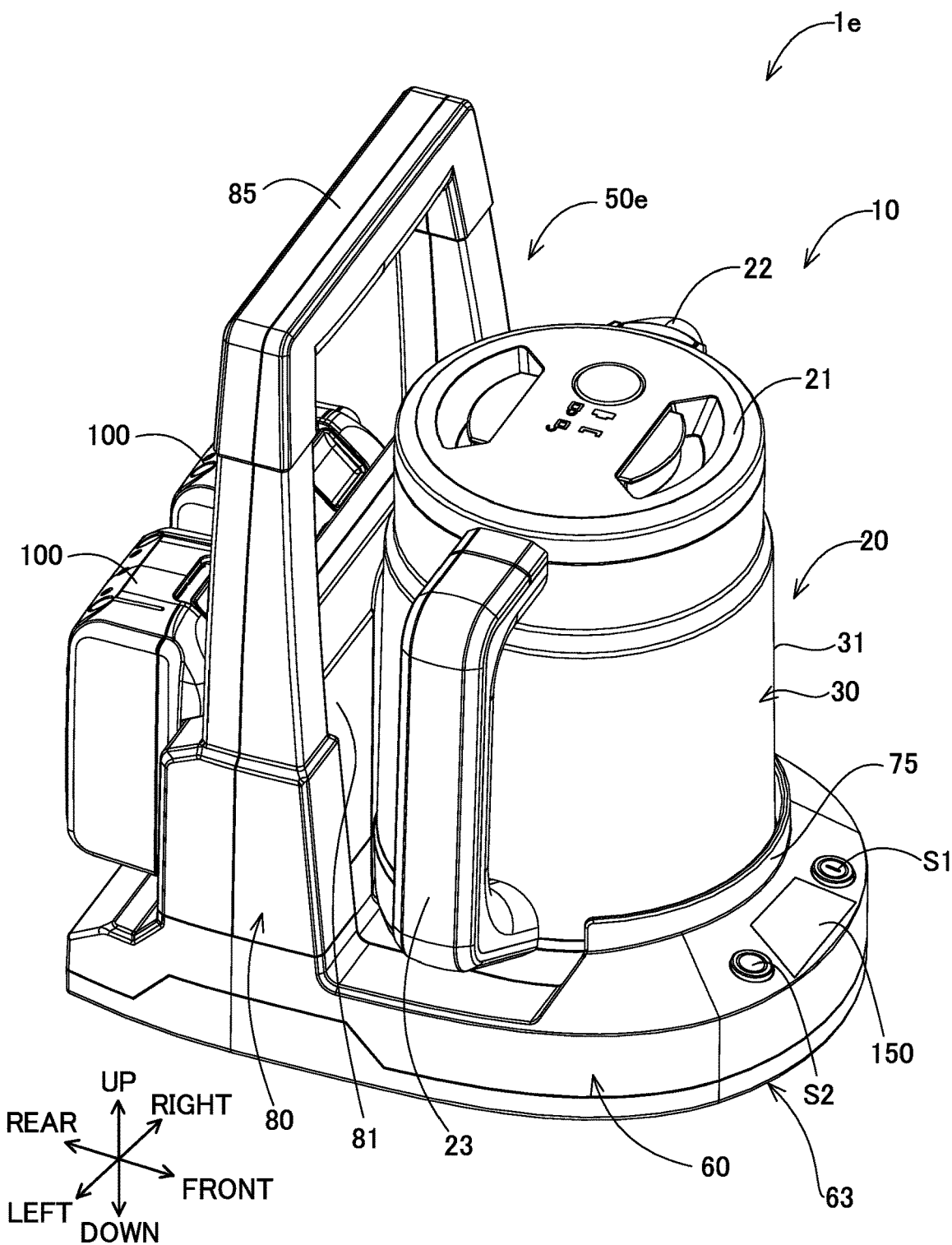

【FIG. 21】
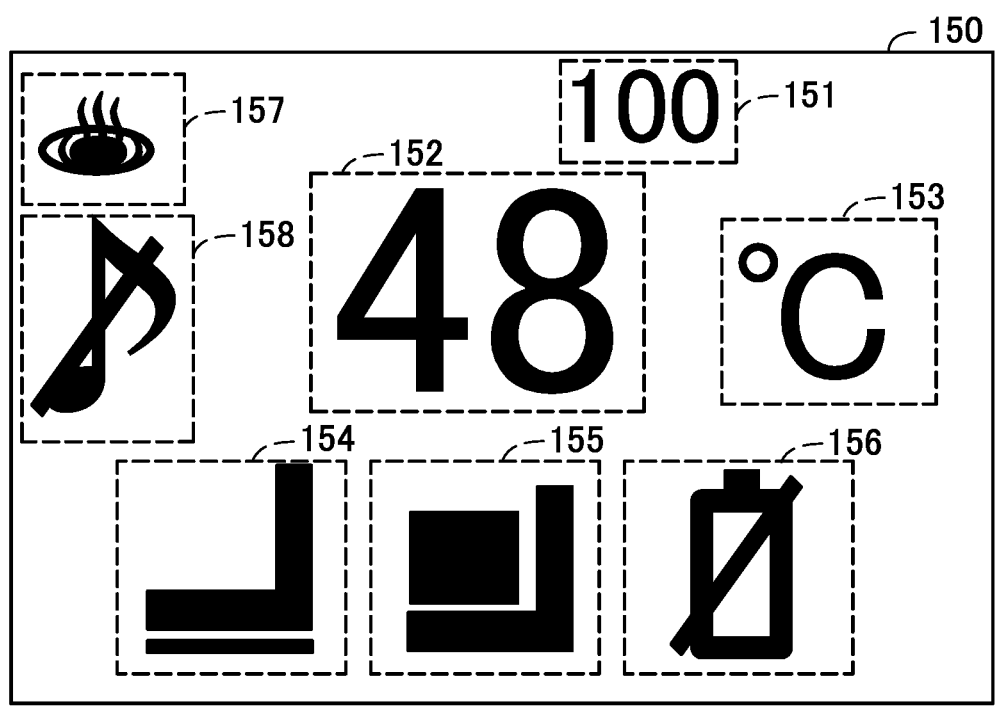

[FIG. 22]
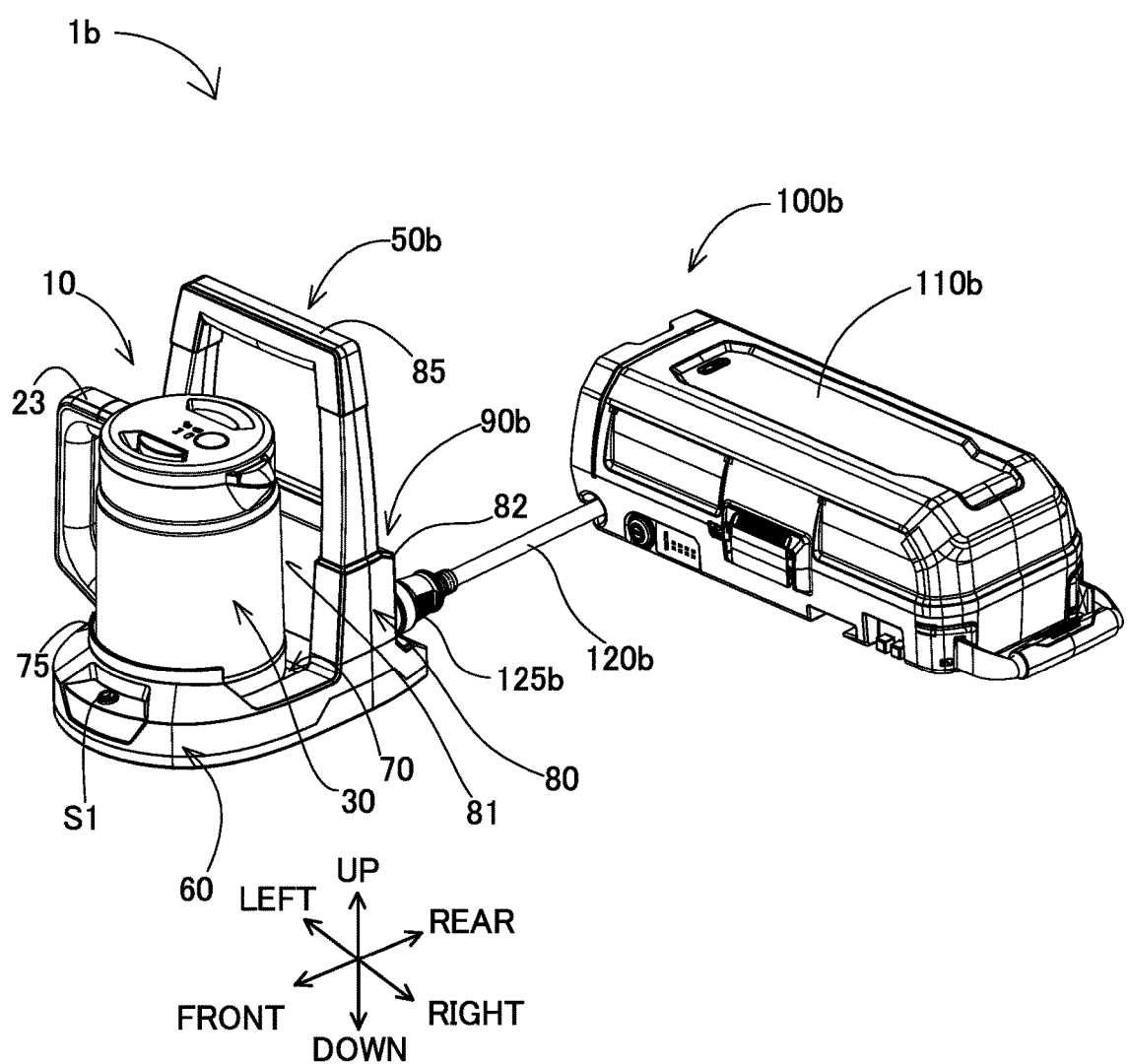

[FIG. 23]
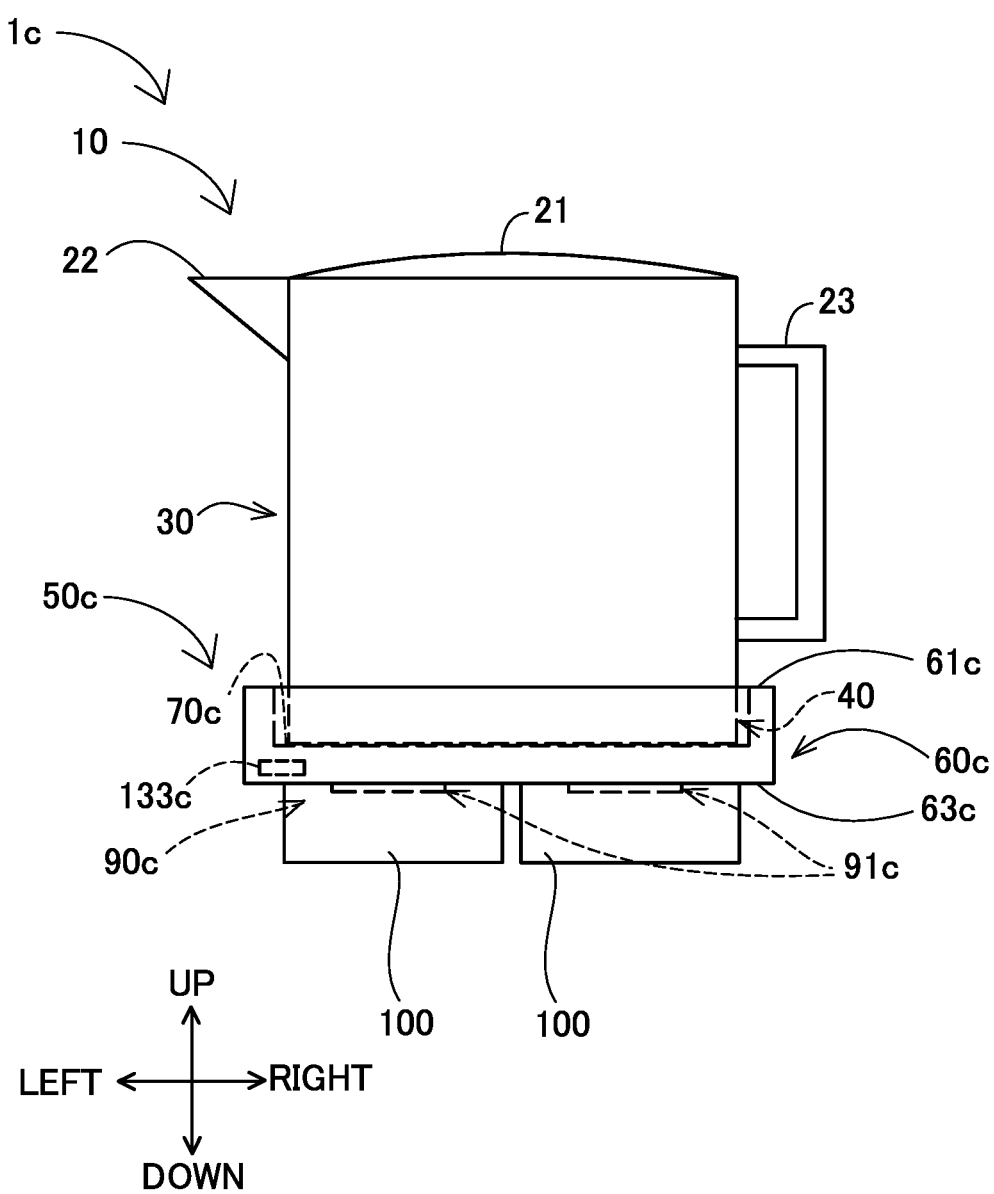

【FIG. 24】
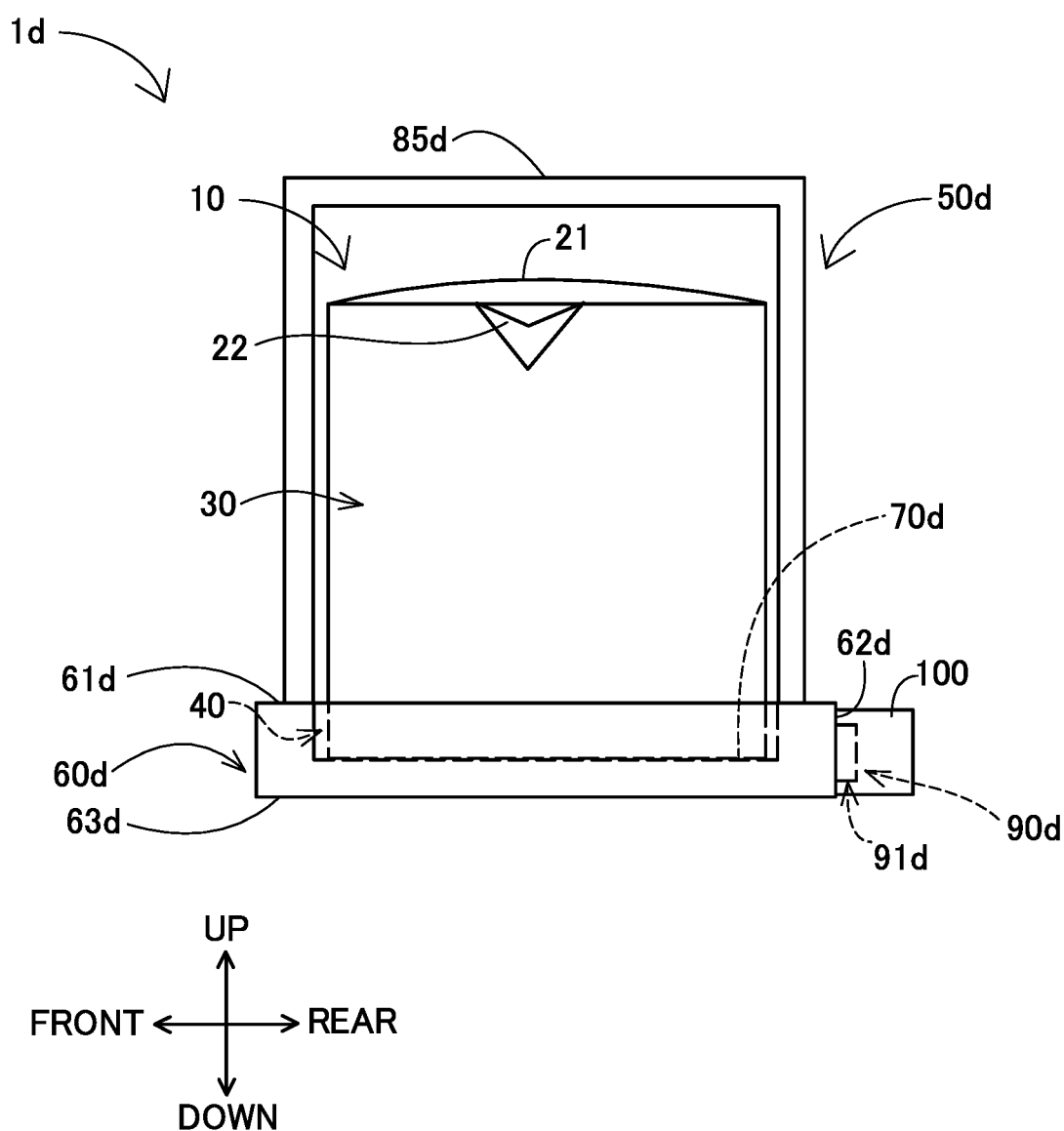

ELECTRIC KETTLE AND POWER SUPPLY UNIT

CROSS REFERENCE TO RELATED ART

The present application claims priority to Japanese Patent Application No. 2020-199410 filed on Dec. 1, 2020, the disclosure of which is hereby incorporated by reference in its entirety.

TECHNICAL FIELD

The present disclosure relates to an electric kettle including a kettle body and a power supply unit, and to a power supply unit.

BACKGROUND

Electric kettles for boiling water in a container with a heating device provided in the container are known. Japanese Unexamined Patent Application Publication No. 2012-80990 discloses an electric kettle in which a battery for supplying power to a heating device is mounted to a rear part of a container. The electric kettle of JP2012-80990A may be too heavy as a whole to be easy to handle, depending on the amount of water in the container and the weight of the battery. It is therefore desired to provide an electric kettle that is easier to handle.

SUMMARY

According to a first aspect of the present disclosure, an electric kettle is provided. The electric kettle has a kettle body and a power supply unit. The kettle body has a power receiving connection part and a heating part. The power receiving connection part is configured to receive power from an external power source, and the heating part is configured to heat liquid contained in the kettle body by the power the power receiving connection part receives. The power supply unit is configured such that the kettle body is placed thereon, and is configured to supply power to the kettle body. The power supply unit has a power supply base, a mounting unit and a first detection part. The power supply base is configured such that the kettle body is placed on top thereof. The power supply base has a power supply connection part that is configured to be electrically removably connected to the power receiving connection part. The mounting unit is configured such that a battery pack is removably coupled thereto as the external power source. The mounting unit is configured to supply power of the mounted battery pack to the heating part via the power supply connection part and the power receiving connection part. The first detection part is configured to detect that the power supply unit is on a plane (flat surface).

According to this aspect, the power supply unit has the mounting unit configured such that the battery pack can be removably coupled thereto, which facilitates handling of the kettle body, compared with a structure in which the battery pack is coupled to the kettle body. Further, with the structure in which the battery pack can be coupled to the power supply unit, a user can use the electric kettle at a desired place, so that the degree of freedom of the use environment of the electric kettle is enhanced. Furthermore, the power supply unit has the first detection part configured to detect that the power supply unit is on a plane, so that the placing state of the power supply unit (whether the power supply unit is on a plane) can be detected. The plane (flat surface) may be, e.g., an at least substantially flat surface of a desk, a floor, or the ground.

According to a second aspect of the present disclosure, a power supply unit is provided which is configured such that a kettle body is placed thereon, and configured to supply power to the kettle body. The power supply unit has a power supply base, a mounting unit and a first detection part. The power supply base is configured such that the kettle body is placed on top thereof. The power supply base has a power supply connection part that is configured to supply power to the kettle body. The mounting unit is configured such that a battery pack is removably coupled thereto to supply power to the kettle body via the power supply connection part. The first detection part is configured to detect that the power supply unit is on a plane (flat surface).

According to this aspect, the power supply unit has the mounting unit configured such that the battery pack can be removably coupled thereto, which facilitates handling of the kettle body, compared with a structure in which the battery pack is coupled to the kettle body. Further, with the structure in which the battery pack can be coupled to the power supply unit, a user can use the electric kettle at a desired place, so that the degree of freedom of the use environment of the electric kettle is enhanced. Furthermore, the power supply unit has the first detection part configured to detect that the power supply unit is on a plane, so that the placing state of the power supply unit can be detected.

BRIEF DESCRIPTION OF THE DRAWINGS

FIG. 1 is a perspective view of an electric kettle 1 with a battery pack 100 mounted thereon.

FIG. 2 is a perspective view of the electric kettle 1 with a kettle body 10 removed from a power supply unit 50.

FIG. 3 is an enlarged perspective view of a power supply connection part 72.

FIG. 4 is a front view of the electric kettle 1 with the battery pack 100 mounted thereon.

FIG. 5 is a right side view of the electric kettle 1 with the battery pack 100 mounted thereon.

FIG. 6 is a left side view of the electric kettle 1 with the battery pack 100 mounted thereon.

FIG. 7 is a top view of the electric kettle 1 with the battery pack 100 mounted thereon.

FIG. 8 is a back view of the electric kettle 1 with the battery pack 100 mounted thereon.

FIG. 9 is a sectional view of the electric kettle 1, taken along line IX-IX in FIG. 5.

FIG. 10 is a sectional view of the electric kettle 1, taken along line X-X in FIG. 4.

FIG. 11 is a top view of the power supply unit 50 with the battery pack 100 mounted thereon.

FIG. 12 is a bottom view of the power supply unit 50 with the battery pack 100 mounted thereon.

FIG. 13 is a sectional view taken along line XIII-XIII in FIG. 12.

FIG. 14 is a top view of the electric kettle 1.

FIG. 15 is a back view of the electric kettle 1.

FIG. 16 shows an example of the battery pack 100.

FIG. 17 is a bottom view of the kettle body 10.

FIG. 18 is a block diagram showing the system configuration of the electric kettle 1.

FIG. 19 is a block diagram showing the system configuration of an electric kettle 1a according to a second embodiment.

FIG. 20 is a perspective view of an electric kettle 1e according to a third embodiment.

FIG. 21 shows an example of a second display part 150 of the electric kettle 1e.

FIG. 22 is a perspective view of an electric kettle 1b according to a fourth embodiment.

FIG. 23 is a schematic view of an electric kettle 1c according to a fifth embodiment.

FIG. 24 is a schematic view of an electric kettle 1d according to a sixth embodiment.

DETAILED DESCRIPTION OF THE EMBODIMENTS

In one, non-limiting embodiment of the present disclosure, the first detection part may include a switch provided in a lower surface of the power supply unit. The switch may be configured to protrude from the lower surface when the power supply unit is not on the plane, while being pushed into the lower surface when the power supply unit is on the plane.

According to this embodiment, whether the power supply unit is on a plane is detected with a simple structure.

In addition or in the alternative to the preceding embodiments of the present disclosure, the electric kettle may further have a first control part. The first control part may be configured to control power supply to the heating part via the power supply connection part and the power receiving connection part based on a detection result of the first detection part. The first control part may be configured to supply power to the heating part when at least one predetermined condition is satisfied, and configured not to supply power to the heating part when the at least one predetermined condition is not satisfied. The at least one predetermined condition may include that the power supply unit is on the plane.

According to this embodiment, the first control part does not execute power supply to the heating part when the power supply unit is not on a plane. Thus, when the power supply unit is moved away from the plane, power is not supplied to the heating part, so that the safety of the electric kettle is enhanced. Accordingly, the safety of the electric kettle 1 is ensured while the degree of freedom of the use environment of the electric kettle is enhanced.

In addition or in the alternative to the preceding embodiments, the electric kettle may further have a second detection part. The second detection part may be configured to detect that the kettle body is on the power supply base.

According to this embodiment, whether the kettle body is on the power supply base is detected.

In addition or in the alternative to the preceding embodiments, the first control part may be further configured to control power supply to the heating part based on a detection result of the second detection part. The at least one predetermined condition may include that the kettle body is on the power supply base.

According to this embodiment, the first control part does not supply power to the heating part when the kettle body is not on the power supply base. Thus, power is not supplied to the heating part when the power supply connection part is exposed even if the power supply unit is on a plane, so that the safety of the electric kettle is further enhanced.

In addition or in the alternative to the preceding embodiments, the electric kettle may further have an indication part and a second control part. The indication part may be configured to indicate drive information of the electric kettle. The second control part may be configured to control the indication part based on a detection result of the first detection part. The second control part may be configured to cause the indication part to indicate, as the drive information, that the power supply unit is not on the plane when the power supply unit is not on the plane.

According to this embodiment, when the power supply unit is not on a plane, the indication part informs (notifies) the user of this information, thereby urging the user to place (put) the power supply unit on a plane. Further, the user can know the reason why heating of liquid in the kettle body does not start. Thus, the electric kettle is provided with high convenience.

In addition or in the alternative to the preceding embodiments, the second control part may be further configured to control the indication part, based on a detection result of the second detection part. The second control part may be configured to control the indication part based on a detection result of the second detection part. The second control part may be configured to cause the indication part to indicate, as the drive information, that the kettle body is not on the power supply base when the kettle body is not on the power supply base.

According to this embodiment, when the kettle body is not on the power supply base, the indication part informs the user of this information, thereby urging the user to place the power supply unit on a plane. Further, the user can know the reason why heating of liquid in the kettle body does not start. Thus, the electric kettle is provided with high convenience.

In addition or in the alternative to the preceding embodiments, the second control part may be further configured to detect a residual capacity of the battery pack via the mounting unit. The second control part may be configured to cause the indication part to indicate, as the drive information, that the (detected) residual capacity of the battery pack is not more than a predetermined residual capacity when the detected residual capacity of the battery pack is not more than the predetermined residual capacity.

According to this embodiment, when the residual capacity of the battery pack is a predetermined residual capacity or less, the indication part informs the user of this information. Thus, the electric kettle is provided with high convenience for the user.

In addition or in the alternative to the preceding embodiments, the power supply unit may have a grip part. The grip part may extend upward from the power supply base and be configured to be held by a user.

According to this embodiment, the user can hold the grip part and carry the power supply unit alone or carry the kettle body and the power supply unit together. Thus, the electric kettle is provided with high convenience for the user.

In addition or in the alternative to the preceding embodiments, the power supply base and the mounting unit may be respectively arranged on opposite sides of the grip part.

According to this embodiment, the possibility that liquid to be used for the electric kettle adheres to the mounting unit can be reduced, so that the safety and durability of the electric kettle is improved.

The technique of the present disclosure can also be realized in various applications other than an electric kettle and a power supply unit, such as a power supply unit having a battery pack, an electric kettle having a battery pack, a control device for an electric kettle, a controlling method for an electric kettle, a controlling method for a power supply unit, and computer programs for a computer to execute these controlling methods.

First Embodiment

<Structure of the Electric Kettle>

An electric kettle 1 according to a first embodiment of the present disclosure is described with reference to FIGS. 1 to 18. The electric kettle 1 includes a kettle body 10 and a power supply unit 50. A user of the electric kettle 1 places the kettle body 10 containing liquid such as water, on a power supply base 70 of the power supply unit 5 having an external power source mounted thereon and turns ON a main switch S1 that is provided in the power supply unit 50 in order to boil liquid in the kettle body 10. A battery pack 100 is mounted on the electric kettle 1 shown in FIGS. 1 and 4 to 8 and the power supply unit 50 shown in FIG. 11. The battery pack 100 is an example of the external power source of the electric kettle 1.

In the following description, for convenience sake, the up-down direction of the electric kettle 1 is defined with reference to the attitude of the kettle body 10 of the electric kettle 1 placed on the power supply unit 50. Specifically, the side on which the kettle body 10 is placed on the power supply unit 50 is an upper side of the electric kettle 1, while the opposite side is a lower side of the electric kettle 1. Further, an extension direction of an axis that is orthogonal to the up-down direction and that intersects the kettle body 10 and a mounting unit 90 for mounting the battery pack 100 is defined as a front-rear direction. In the front-rear direction, the side on which the mounting unit 90 is arranged on the power supply unit 50 is defined as a rear side, while the side on which the kettle body 10 is arranged is defined as a front side. A direction orthogonal to the up-down direction and the front-rear direction is defined as a left-right direction.

<Structure of the Power Supply Unit>

The power supply unit 50 is configured such that the kettle body 10 is placed thereon, and configured to supply power to the kettle body 10. In this embodiment, the power supply unit 50 mainly includes a base part 60, a wall part 80 and the mounting unit 90. The power supply unit 50 can be formed of metal or resin (polymer). The wall part 80 is a generally plate-like member extending upward from the base part 60.

As shown in FIG. 2, the base part 60 is a generally plate-like member extending in the front-rear direction and the left-right direction. A lower surface 63 of the base part 60 can be (placed) on a table (or a desk), floor or ground.

The power supply base 70 is provided in a region of the base part 60 on a front surface 81 side of the wall part 80. The power supply base 70 is configured such that a bottom part 40 of the kettle body 10 is placed thereon. A lower surface 41 of the kettle body 10 is placed on an upper surface 71 of the power supply base 70. In this embodiment, the upper surface 71 of the power supply base 70 is located below an upper end of a side wall 62 of the base part 60. The area of the power supply base 70 is slightly larger than the area of the bottom part 40 of the kettle body 10. A power supply connection part 72 is provided substantially on a central portion of the upper surface 71 of the power supply base 70. As shown in the perspective view of FIG. 2, the sectional views of FIGS. 9 and 10 showing the electric kettle 1 and the top view of FIG. 11 showing the power supply unit 50, the power supply connection part 72 protrudes upward from the upper surface 71. The power supply connection part 72 is configured such that a power receiving connection part 42 (described below) of the kettle body 10 is fitted thereon. As shown in FIG. 3, in this embodiment, the power supply connection part 72 has a generally truncated conical shape having a bottom on the lower side and has a pair of notches 79 formed (recessed) from a side face 72s of the truncated conical part toward the center. A power supply connection terminal 73 that is a conductive member is provided in each of the notches 79. The power supply connection terminal 73 supplies power to the kettle body 10 from the battery pack 100 mounted on the mounting unit 90.

As shown in FIGS. 12 and 13, a bottom switch 133 is provided in the lower surface 63 of the power supply unit 50. The lower surface 63 of the power supply unit 50 shown in FIG. 13 is not placed (situated, located) on a plane (flat surface). The bottom switch 133 is of a push-in type. In this embodiment, the bottom switch 133 includes a button 134 and a button receiver 135. The button 134 and the button receiver 135 are configured to be movable in the up-down direction. The button 134 protrudes downward from the lower surface 63 of the base part 60 while the lower surface 63 is not on a plane. The button receiver 135 is arranged above the button 134 to face the button 134. The button 134 is configured to be pushed into the lower surface 63 of the base part 60 so as not to protrude downward from the lower surface 63 of the base part 60, in response to the lower surface 63 of the base part 60 being placed (put, mounted) on a plane. The plane refers to, for example, an at least substantially flat (even) surface (e.g., the top surface of a desk, a floor surface, or a ground surface). The button receiver 135 is configured to be pushed upward by the button 134 when the lower surface 63 of the power supply unit 50 is placed (put, mounted) on a plane and the button 134 is pushed in upward. The button receiver 135 is configured to transmit an ON signal to a control part 66 (described below) when a lower surface of the button 134 is substantially flush with the lower surface 63 of the base part 60. When the lower surface 63 of the power supply unit 50 is moved away from the plane, the button 134 and the button receiver 135 move downward. As a result, the ON signal from the button receiver 135 to the control part 66 is cut off (in other words, the bottom switch 133 is turned OFF). The bottom switch 133 serves as a detection part for detecting whether the power supply unit 50 is placed on a plane (flat surface) (or whether the power supply unit 50 is being situated/located on a plane).

In this embodiment, the power supply base 70 further has the following structure.

As shown in FIG. 3, the notch 79 has a pair of faces 79s connected to the side face 72s, and a face 79c connecting the faces 79s. The faces 79s are substantially parallel to each other in the up-down direction and are opposed across the power supply connection terminal 73. An upper end of each of the faces 79s is located below an upper face 72u of the power supply connection part 72. The upper end of the face 79s is connected to the upper face 72u via an inclined face 79g. The inclined face 79g is inclined toward the power supply connection terminal 73. The inclined face 79g serves as a guide to move the kettle body 10 in the circumferential direction such that a power receiving connection terminal 45 of the kettle body 10 is connected to the power supply connection terminal 73, which will be described in detail below.

The side face 72s of the power supply connection part 72 is shaped to conform to a side face 42s (see FIG. 17) of the power receiving connection part 42 (described below) of the kettle body 10. Specifically, the power supply connection part 72 is configured such that the kettle body 10 can be moved in the circumferential direction while the side face 42s of the power receiving connection part 42 can be moved along the side face 72s of the power supply connection part 72. Further, the power supply connection part 72 is configured to restrict rotation of the kettle body 10 when fitted in the power receiving connection part 42 of the kettle body 10. To restrict rotation herein means that the kettle body 10 is hardly movable in the circumferential direction when placed on the power supply base 70. Being hardly movable means that the kettle body 10 is movable only within a range in which the power receiving connection terminal 45 is held electrically connected to the power supply connection terminal 73. It can also be said that the power supply connection part 72 is configured such that the kettle body 10 cannot rotate when the power supply connection part 72 is fitted in the power receiving connection part 42 of the kettle body 10.

As shown in FIGS. 10 and 11, a pair of terminals (first energizing terminals 131) are provided in the upper surface 71 of the power supply base 70. The first energizing terminals 131 are closer to an outer edge of the power supply base 70 in the radial direction, than to the power supply connection part 72 and arranged substantially symmetrically to the power supply connection part 72. The first energizing terminals 131 are respectively arranged in positions to be connected to second energizing terminals 132 (see FIG. 17) provided in the lower surface 41 of the kettle body 10 when the kettle body 10 is on the power supply base 70. In this embodiment, the first energizing terminals 131 are electrically connected to the second energizing terminals 132 when the power supply connection part 72 of the power supply base 70 is fitted in (into) the power receiving connection part 42 of the kettle body 10.

As shown in FIGS. 2, 11 and 12, the power supply base 70 has through holes 77 formed through the power supply base 70 in the up-down direction. In this embodiment, the through holes 77 are closer to an outer edge of the power supply base 70, i.e., closer to the outer edge of the power supply base 70 in the radial direction, than to the power supply connection part 72. It can also be said that the through holes 77 are closer to the side wall 62 of the base part 60 and the wall part 80. In this embodiment, four such through holes 77 are provided and arranged substantially symmetrically to the power supply connection part 72.

As shown in FIGS. 9 and 10, the upper surface 71 of the power supply base 70 has an inclined surface 74 inclined downward from the power supply connection part 72 toward the outside (outer edge) of the power supply base 70.

As shown in FIGS. 1, 2 and 4 to 7, a rib 75 is formed in front of the power supply base 70 and protrudes upward from the power supply base 70. The rib 75 is formed in a position to face the front surface 81 of the wall part 80. The rib 75 is shaped to conform to the outer edge of the power supply base 70 and an outer peripheral surface 31 (described below) of the kettle boy 10. The rib 75 restricts forward movement of the kettle body 10 placed on the power supply base 70. In this embodiment, an upper end of the rib 75 in the up-down direction is located above a lower end of a kettle grip part 23 (described below) of the kettle body 10 on the power supply base 70.

The wall part 80 is now described. In this embodiment, the wall part 80 is a generally plate-like member extending in the up-down direction and the left-right direction. The wall part 80 extends upward from the power supply base 70. The power supply base 70 is provided in a region on the front surface 81 side of the wall part 80, and the mounting unit 90 is provided in a region on a rear surface 82 side of the wall part 80. In this embodiment, the wall part 80 separates the region for the power supply base 70 and the region for the mounting unit 90.

The wall part 80 has a power supply unit grip part 85 that is arranged above the mounting unit 90 and configured to be held (gripped, grasped) by the user. The power supply unit grip part 85 is shaped with a through hole extending through the wall part 80 in the front-rear direction. It can also be said that the power supply unit grip part 85 is provided between the mounting unit 90 and the kettle body 10 on the power supply base 70 in the front-rear direction. An upper end of the power supply unit grip part 85 protrudes above the kettle body 10 on the power supply base 70. In this embodiment, the electric kettle 1 is configured such that the center of gravity of the electric kettle 1 is located on or near the wall part 80 irrespective of the amount of liquid in the kettle body 10 when the battery packs 100 are mounted on the mounting unit 90 and the kettle body 10 is on the power supply base 70. Thus, the power supply unit grip part 85 is arranged directly above the center of gravity of the electric kettle 1.

As shown in FIGS. 2 and 11, the wall part 80 has a recessed part 83 formed in the front surface 81 and recessed from the front surface 81 toward the rear surface 82. The recessed part 83 is shaped to conform to the outer peripheral surface 31 of the kettle body 10.

As shown in FIGS. 8 and 15, a first display part 86 is provided on the rear surface 82 of the wall part 80. In this embodiment, the residual capacity of the battery pack 100 is displayed on the first display part 86, which will be described in detail below.

The battery pack 100 to be mounted on the mounting unit 90 and the mounting unit 90 are now described with reference to FIGS. 14 to 16.

The battery pack 100 is an example of an external power source to be coupled to (mounted on) the mounting unit 90. The battery pack 100 is, for example, a battery pack having a nominal voltage of 18 volt and can be used as a power source of the electric kettle 1.

The battery pack 100 may also be called as a battery package or an assembled battery, and has an outer shell housing formed into a prescribed size and a plurality of lithium ion battery cells that are housed in the outer shell housing and connected in series. The battery pack 100 is a rechargeable battery pack and can be recharged by a charger (not shown) after used as an external power source. The battery pack 100 is a so-called slide-type battery pack and can be removably coupled to (mounted on) the mounting unit 90 or a charger.

In FIG. 16, the up-down direction, the front-rear direction and the left-right direction are shown with reference to the attitude of the battery pack 100 mounted on the mounting unit 90. The battery pack 100 has a pair of left and right rail receiving parts 101. A positive output terminal 102 and a negative output terminal 103 are arranged between the rail receiving parts 101. A connector part 104 is arranged between the positive output terminal 102 and the negative output terminal 103 and configured to transmit and receive control signals to and from a charger and other devices. A lock member 105 is provided on an upper part of the battery pack 100. A spring member (not shown) is arranged below the lock member 105 within the housing of the battery pack 100. The spring member biases the lock member 105 to press the lock member 105 upward. An unlock button 106 (see, for example, FIG. 11) is arranged on a rear surface of the battery pack 100. When the unlock button 106 is pressed downward, the lock member 105 moves downward.

As shown in FIGS. 14 and 15, the mounting unit 90 is arranged on the rear surface 82 side of the wall part 80. In this embodiment, the mounting unit 90 is provided on a lower part of the rear surface 82 of the wall part 80. The mounting unit 90 has two mounting parts 91 having the same structure and electrically connected in series to each other.

The mounting unit 90 is configured to connect in series two battery packs 100, for example, each having a nominal voltage of 18 volt. The electric kettle 1 can be driven with power supplied from the mounting unit 90 having the two battery packs 100 mounted thereto.

The mounting part 91 has a pair of slide rails 92. In this embodiment, the slide rails 92 extend in the up-down direction. A positive input terminal 93 and a negative input terminal 94 are arranged on the slide rails 92. The mounting part 91 further has a lock receiving hole 95 that is engageable with the lock member 105 of the battery pack 100.

The rail receiving parts 101 are engaged with the slide rails 92 and the battery pack 100 is mounted onto the mounting part 91 by sliding the battery pack 100 in a mounting direction relative to the mounting part 91. In this embodiment, the mounting direction is from up to down. When the battery pack 100 is mounted onto the mounting part 91, the positive input terminal 93 and the negative input terminal 94 of the mounting part 91 are electrically connected to the positive output terminal 102 and the negative output terminal 103 of the battery pack 100. Further, when the battery pack 100 is mounted onto the mounting part 91, the lock member 105 is engaged with the lock receiving hole 95 and the battery pack 100 is locked so as not to move in the up-down direction.

When a user presses down the unlock button 106 of the battery pack 100 mounted onto the mounting part 91, the lock member 105 is disengaged (unlocked) from the lock receiving hole 95. When the battery pack 100 is slid in a removing direction relative to the mounting part 91 in the unlocked state, the battery pack 100 is removed from the mounting part 91. In this embodiment, the removing direction is from down to up. Thus, the battery pack 100 can be removably mounted onto the mounting part 91 of the mounting unit 90.

<Structure of the Kettle Body>

As shown in FIGS. 1 to 2 and 4 to 10, the kettle body 10 has appearance mainly having a body unit 20 and a lid 21. The body unit 20 has a bottomed hollow cylindrical shape having an open top. The lid 21 is connected to the body unit 20 and configured to open and close the open top of the body unit 20. The body unit 20 has a side wall part 30, a bottom part 40 and a liquid containing part 48.

The side wall part 30 is a generally hollow cylindrical part extending in the up-down direction of the body unit 20. The side wall part 30 forms the outer peripheral surface 31 of the kettle body 10. A spout 22 for pouring liquid from the liquid containing part 48 is formed in an upper end part of the side wall part 30. The kettle grip part 23 for holding the kettle body 10 is provided in a position opposed to the spout 22 when the kettle body 10 is viewed from above. Ends of the kettle grip part 23 are connected to upper and lower end parts of the side wall part 30. The side wall part 30 and the kettle grip part 23 can be formed of metal or resin.

The bottom part 40 is a part connected to the lower end of the side wall part 30. The bottom part 40 can be formed of metal or resin. The power receiving connection part 42 is provided on the center of the lower surface 41 of the bottom part 40. As shown in the sectional views of FIGS. 9 and 10 showing the electric kettle 1 and the bottom view of FIG. 17 showing the kettle body 10, the power receiving connection part 42 protrudes upward from the lower surface 41. The power receiving connection part 42 is configured to be fitted on the power supply connection part 72 of the power supply unit 50. In this embodiment, the power receiving connection part 42 has a generally truncated conical shape having a bottom on the lower side and has a pair of plate-like members 44 protruding from a side face of the truncated conical part toward the center. The power receiving connection terminal 45 that is a conductive member is provided on each of the plate-like members 44. The power receiving connection terminal 45 receives power from an external power source via the power supply connection part 72. In this embodiment, the power receiving connection part 42 is configured to restrict movement of the kettle body 10 in cooperation with the power supply connection part 72 of the power supply unit 50 when fitted on the power supply connection part 72.

In this embodiment, each of the plate-like members 44 has a gap extending substantially in the up-down direction and configured such that the power supply connection terminal 73 can be inserted therein. The power receiving connection terminal 45 is provided on a pair of faces 44s of the plate-like member 44 that define the gap. When the kettle body 10 is positioned relative to the power supply connection part 72 in the circumferential direction such that the plate-like members 44 are fitted in the notches 79 (see FIG. 3), the power receiving connection terminals 45 are connected to the power supply connection terminals 73, respectively, and movement of the kettle body 10 is restricted.

In this embodiment, as described above, each of the notches 79 of the power supply connection part 72 has the inclined face 79g inclined downward from the upper face 72u of the power supply connection part 72 toward the power supply connection terminal 73. When the plate-like member 44 of the kettle body 10 is located on the inclined face 79g, the kettle body 10 moves downward along the inclined face 79g under its own weight and the plate-like member 44 is fitted in the notch 79. Thus, in the electric kettle 1 according to this embodiment, positioning of the kettle body 10 relative to the power supply unit 50 is completed when the plate-like member 44 is placed on the notch 79 or the inclined face 79g in the circumferential direction. Even if the plate-like member 44 is not placed on the inclined face 79g, a user can move the kettle body 10 in the circumferential direction to place the plate-like member 44 on the inclined face 79g. Thus, the kettle body 10 moves downward along the inclined face 79g under its own weight, so that the positioning of the kettle body 10 is completed.

Further, in this embodiment, the lower surface 41 of the bottom part 40 of the kettle body 10 has an inclined face 46 inclined downward and radially outward from the power receiving connection part 42. The inclined face 46 is shaped to conform to the inclined surface 74 of the power supply base 70. Thus, the kettle body 10 is stably placed on the power supply base 70.

As shown in FIG. 17, a pair of terminals (the second energizing terminals 132) are provided in the lower surface 41 of the kettle body 10. The second energizing terminals 132 are closer to an outer edge of the lower surface 41 in the radial direction, than to the power receiving connection part 42 and arranged substantially symmetrically to the power receiving connection part 42. The second energizing terminals 132 are respectively arranged in positions to be connected to the first energizing terminals 131 (see FIGS. 10 and 11) provided in the upper surface 71 of the power supply base 70 when the kettle body 10 is placed on the power supply base 70. The second energizing terminals 132 are electrically connected to the first energizing terminals 131 when the power supply connection part 72 of the power supply base 70 is fitted in (into) the power receiving connection part 42 of the kettle body 10.

The liquid containing part 48 is provided inside of the side wall part 30 and the bottom part 40. The liquid containing part 48 is shaped such that liquid such as water can be stored inside. An inner surface of the liquid containing part 48 may be coated with heat-resistant resin such as fluororesin. A bottom of the liquid containing part 48 is formed of heat conductive materials such as metal.

As shown in FIG. 9, a temperature sensor Tc for measuring the temperature of liquid in the liquid containing part 48 is provided on a bottom of the liquid containing part 48. In this embodiment, a circuit for the temperature sensor Tc is formed (activated, worked, completed, closed) by contact (connection) between the first energizing terminals 131 and the second energizing terminals 132. Specifically, in the electric kettle 1, when the kettle body 10 is placed (put, mounted) on the power supply base 70, the second energizing terminals 132 get into contact with the first energizing terminals 131, and then the temperature of liquid in the liquid containing part 48 can be measured. The first energizing terminals 131, the second energizing terminals 132 and the temperature sensor Tc also serve as a detection part for detecting whether the kettle body 10 is on the power supply unit 50. The measurement result of the temperature sensor Tc is transmitted to the control part 66 described below.

As shown in FIG. 10, a heater 49 is installed in the bottom part 40. The heater 49 receives power via the power receiving connection part 42 and heats liquid in the liquid containing part 48 (directly) above the bottom part 40. The structure of the kettle body 10 described in this embodiment is just an example. The kettle body 10 may have a known structure except a structure in which power is received from the power supply unit 50 having the mounting unit 90.

<System Configuration>

One example of the system configuration of the electric kettle 1 is now described. As shown in FIG. 18, in this embodiment, the power supply unit 50 has a control device (control unit, control circuit, circuitry) 65. The control device 65 of this embodiment is configured as a microcomputer, having a CPU, a memory. The control device 65 (specifically, CPU) is configured to implement various functions to serve as control part 66 by executing programs stored in the memory. The control part 66 controls the various operations of the electric kettle 1 using the detection results of the above-described parts or components. Examples of various controls of the control part 66 are now described.

The control part 66 is configured to obtain an ON signal from the bottom switch 133 when the bottom switch 133 is pushed. When the control part 66 obtains an ON signal of the bottom switch 133 (in other words, the ON signal is output to the control part 66 from the bottom switch 133), it means that the power supply unit 50 is placed on a plane. On the other hand, when the control part 66 does not obtain an ON signal of the bottom switch 133, it means that the power supply unit 50 is not on a plane.

The control part 66 is configured to obtain a measurement result of the temperature sensor Tc when the circuit for the temperature sensor Tc is formed (activated, completed, closed) by contact between the first energizing terminals 131 and the second energizing terminals 132. When the control part 66 obtains a measurement result of the temperature sensor Tc, it means that the kettle body 10 is on the power supply base 70. On the other hand, when the control part 66 does not obtain a measurement result of the temperature sensor Tc, it means that the kettle body 10 is not on the power supply base 70.

The control part 66 is configured to obtain information relating to the voltage of the battery pack 100 via the mounting unit 90. The control part 66 calculates the residual capacity of the battery pack 100 by using a predetermined relation between the voltage and the residual capacity. In this embodiment, the control part 66 displays information indicating the residual capacity of the battery pack 100 on the first display part 86 (see FIG. 15).

Next, the power supply control to the heater 49 performed by the control part 66 is described. The control part 66 supplies power to the heater 49 via the power supply connection part 72 and the power receiving connection part 42 when predetermined conditions are satisfied. In this embodiment, the predetermined conditions include three conditions: (i) that the power supply unit 50 is on a plane; (ii) that the kettle body 10 is on the power supply base 70; and (iii) that the residual capacity of the battery pack 100 is a predetermined residual capacity or more. The predetermined residual capacity in this embodiment is a capacity required to boil a prescribed amount of water (liquid) within the kettle body 10. When all the three conditions are satisfied, i.e., when (i) the power supply unit 50 is on a plane, (ii) the kettle body 10 is on the power supply base 70, the residual capacity of the battery pack 100 is a predetermined residual capacity or more, and (iii) the control part 66 controls the power supply unit 50 to supply power to the heater 49. For example, when the power supply unit 50 is being carried by a user, or when the kettle body 10 is not on the power supply base 70, the control part 66 does not supply power to the heater 49.

Further, the control part 66 is configured to inform (notify) the user of drive information of the electric kettle 1. In this embodiment, the drive information includes three kinds of information; (i) that the power supply unit 50 is not on a plane; (ii) that the kettle body 10 is not on the power supply base 70; and (iii) that the residual capacity of the battery pack 100 is not more than the predetermined residual capacity. In this embodiment, the main switch S1 (e.g., a pushbutton) is provided with a light that is lighted when the main switch S1 is turned ON. Further, the power supply unit 50 has a sound output part 141 configured to output sound. The control part 66 controls the light of the main switch S1, the sound output part 141 and the first display part 86 to indicate the drive information. For example, when the main switch S1 is ON and the power supply unit 50 is not on a plane, the control part 66 blinks the light of the main switch S1 and/or outputs attention (caution) sound from the sound output part 141. The control part 66 may change the color and the blinking time of the light of the main switch S1, the duration of the attention sound, and combinations thereof.

In this embodiment, the control part 66 is configured to stop power supply to the heater 49 while keeping the main switch S1 ON when the predetermined conditions are not satisfied, and to restart power supply to the heater 49 if the above-described conditions are satisfied again within a predetermined time period after the stop. Further, the control part 66 is configured to turn OFF the main switch S1 if the above-described conditions are not satisfied even if a predetermined time elapses after power supply to the heater 49 is stopped while the main switch S1 is kept ON. The predetermined time is, for example, any one of time periods of one to five seconds. Provision of such a structure of the electric kettle 1 allows a user to lift the power supply unit 50, or lift the kettle body 10 from the power supply base 70, for a relatively short time during power supply to the heater 49, thereby improving convenience for the user. The control part 66 may be configured to control the main switch S1 and the sound output part 141 to indicate the above-described drive information during the above-described predetermined time, thereby urging the user to place the power supply unit 50 on a plane or to place the kettle body 10 on the power supply base 70.

Further, in this embodiment, the control part 66 is configured to obtain a predetermined set temperature. The control part 66 is configured to control to heat the liquid in the liquid containing part 48 up to the set temperature by using the measured value obtained from the temperature sensor Tc and the set temperature. The set temperature may be set by a user, for example, by using a temperature setting part 67 provided in the power supply unit 50 (see FIG. 18). The temperature setting part 67 is an input interface by which a user can set a temperature. Further, the predetermined set temperature may be stored in the memory of the control device 65 in advance. For example, the boiling temperature of the liquid may be stored as the set temperature in the memory.

<Effects>

According to the above-described first embodiment, the electric kettle 1 has the following effects.

(A1) The power supply unit 50 has the mounting unit 90 configured such that the battery pack 100 can be removably coupled thereto (mounted thereon), which facilitates handling of the kettle body 10, compared with a structure in which the battery pack 100 is coupled to the (mounted thereon) kettle body 10. Further, with the structure in which the battery pack 100 can be coupled to (mounted on) the power supply unit 50, a user can use the electric kettle 1 at a desired place, so that the degree of freedom of the use environment of the electric kettle 1 is enhanced.

(A2) The bottom switch 133 is provided in the lower surface 63 of the power supply unit 50, and configured to protrude from the lower surface 63 when the power supply unit 50 is not on a plane, while being pushed into the lower surface 63 when the power supply unit 50 is on a plane. Thus, whether the power supply unit 50 is on a plane is detected with a simple structure.

(A3) The control part 66 is configured to supply power to the heater 49 when the predetermined conditions including that the power supply unit 50 is on a plane are satisfied. Accordingly, power is not supplied to the heater 49 when the power supply unit 50 is not on a plane. This reduces the possibility that water or other liquid in the kettle body 10 is boiled to generate high temperature steam, for example, while a user is carrying the electric kettle 1 (the power supply unit 50). Thus, the electric kettle 1 is provided which offers a high level of safety while enhancing the degree of freedom of the use environment.

(A4) The electric kettle 1 has the first energizing terminals 131 provided in the upper surface 71 of the power supply base 70 and the second energizing terminals 132 provided in the lower surface 41 of the kettle body 10. The circuit for the temperature sensor Tc is formed (activated, completed, closed) by electric connection between the first and second energizing terminals 131, 132. In other words, the circuit for the temperature sensor Tc is activated when terminals 131 and terminals 132 come into contact with each other. With this structure, it can be detected whether the kettle body 10 is on the power supply base 70 depending on whether a measurement result of the temperature sensor Tc is obtained.

(A5) In this embodiment, the predetermined conditions for supplying power to the heater 49 include that the kettle body 10 is on the power supply base 70. Accordingly, the control part 66 does not supply power to the heater 49 when the kettle body 10 is not on the power supply base 70. Therefore, power is not supplied to the heater 49 when the power supply connection part 72 is exposed even if the power supply unit 50 is on a plane. This enhances the safety of the electric kettle 1 when a user unintentionally touches the power supply connection part 72 or when water or other liquid drops onto the power supply connection part 72.

(A6) When the power supply unit 50 is not on a plane, the control part 66 informs the user of this information, thereby urging the user to place the power supply unit 50 on a plane. Further, the user can know the reason why water or other liquid in the kettle body 10 is not heated. Thus, the electric kettle 1 is provided with high convenience.

(A7) When the kettle body 10 is not on the power supply base 70, the control part 66 informs the user of this information, thereby urging the user to place the kettle body 10 on the power supply base 70. Further, the user can know the reason why water or other liquid in the kettle body 10 is not heated. Thus, the electric kettle 1 is provided with high convenience.

(A8) The control part 66 stops power supply to the heater 49 while keeping the main switch S1 ON when the predetermined conditions are not satisfied, and restarts power supply to the heater 49 if the above-described conditions are satisfied again within a predetermined time period after the stop. Further, the control part 66 turns OFF the main switch S1 if the above-described conditions are not satisfied again within a predetermined time after the stop. Provision of this structure allows a user to lift the power supply unit 50, or lift the kettle body 10 from the power supply base 70, for a relatively short time during power supply to the heater 49. Thus, the electric kettle 1 is provided with safety and convenience.

(A9) When the residual capacity of the battery pack 100 is not more than a predetermined residual capacity or more, the control part 66 informs the user of this information. Thus, the electric kettle 1 is provided with high convenience for the user.

(A10) The power supply unit 50 has the power supply unit grip part 85 extending upward from the power supply base 70 and configured to be held by a user. Therefore, the user can hold the power supply unit grip part 85 and carry the power supply unit 50 alone or carry the kettle body 10 and the power supply unit 50 together. Thus, the electric kettle 1 is provided with high convenience for the user.

(A11) The power supply base 70 on which the kettle body 10 is placed is arranged on the first surface (the front surface 81) side of the wall part 80 (the power supply unit grip part 85), and the mounting unit 90 is arranged on the second surface (the rear surface 82) side of the wall part 80. Thus, the possibility that liquid to be used for the electric kettle 1 adheres to the mounting unit 90 can be reduced, so that the safety and durability of the electric kettle 1 is improved. Furthermore, when a user opens the lid 21 of the kettle body 10 and puts liquid into the kettle body 10 while leaving the kettle body 10 placed on the power supply base 70, the possibility that the liquid also adheres to the mounting unit 90 or the battery pack 100 can be reduced. Thus, the safety and durability of the electric kettle 1 is improved, and the degree of freedom in handling of the electric kettle 1 is improved.

(A12) The mounting unit 90 has the slide rails 92 extending in the up-down direction and configured such that the battery pack 100 is removably coupled thereto by sliding on the slide rails 92 in the up-down direction. Thus, even if the liquid in the kettle body 10 adheres to the slide rails 92, the liquid can easily drop downward, so that the safety and durability of the electric kettle 1 is further improved.

(A13) The power supply unit grip part 85 is arranged above the mounting unit 90 on the wall part 80. Thus, the attitude of the electric kettle 1 can be stabilized with the battery pack 100 mounted on the rear surface 82 of the wall part 80 and with the kettle body 10 placed on the power supply base 70 on the front surface 81 side of the wall part 80. Accordingly, the possibility of tilting of the electric kettle 1 can be reduced when the electric kettle 1 is carried by a user, so that the electric kettle 1 is provided which is easier to carry.

In relation to the above-described effect (A13), in this embodiment, the electric kettle 1 is configured such that the center of gravity of the electric kettle 1 is located on or near the wall part 80 irrespective of the amount of liquid in the kettle body 10 when the battery pack 100 is mounted on the mounting unit 90 and the kettle body 10 is placed on the power supply unit 50. Thus, the power supply unit grip part 85 is arranged directly above the center of gravity of the electric kettle 1 in use, so that the electric kettle 1 is provided which is further easier to carry.

(A14) The power supply unit 50 has the rib 75 protruding upward from the power supply base 70 and facing the front surface 81 of the wall part 80. Thus, the possibility that the electric kettle 1 is displaced from the power supply base 70 can be reduced when the electric kettle 1 is carried, so that the electric kettle 1 is provided which is easier to carry.

(A15) The power supply base 70 has the through holes 77 formed through the power supply base 70 in the up-down direction. Thus, even if the liquid adheres to the power supply base 70, the liquid can be discharged through the through holes 77. Accordingly, the possibility that the liquid stays on the power supply base 70 can be reduced, so that the safety and durability of the electric kettle 1 is further improved.

(A16) The power supply base 70 includes the inclined surface 74 inclined downward from the central portion of the upper surface 71 toward the outer edge of the power supply base 70. Thus, even if liquid adheres to the power supply base 70, the liquid is discharged toward the outside. Further, the through holes 77 are arranged closer to the outer edge of the power supply base 70 than to the central portion of the power supply base 70. Thus, the liquid that can flow toward the outer edge is discharged through the through holes 77 arranged close to the outer edge. Accordingly, the possibility that the liquid stays on the power supply base 70 can be further reduced, so that the safety and durability of the electric kettle 1 is furthermore improved.

(A17) The wall part 80 of the power supply unit 50 has the recessed part 83 formed in the front surface 81 and recessed from the front surface 81 toward the rear surface 82 of the wall part 80. The recessed part 83 is shaped to conform to the outer peripheral surface 31 of the side wall part 30 of the kettle body 10. Thus, the user can place the kettle body 10 on the power supply base 70 along the recessed part 83, so that the kettle body 10 is placed in a proper position.

(A18) The power receiving connection part 42 of the kettle body 10 and the power supply connection part 72 of the power supply base 70 are configured to be fitted together when the kettle body 10 is placed on the power supply base 70. The power receiving connection part 42 and the power supply connection part 72 are configured to restrict rotation of the kettle body 10 on the power supply base 70 when fitted together. Thus, power can be stably supplied from the power supply unit 50 to the kettle body 10.

(A19) The upper end of the rib 75 in the up-down direction is located above the lower end of the kettle grip part 23 of the kettle body 10 placed on the power supply base 70. Thus, the user can place the kettle body 10 on the power supply unit 50 such that the kettle grip part 23 is located between the rib 75 and the wall part 80 in the front-rear direction. Further, in this embodiment, the power receiving connection part 42 and the power supply connection part 72 are configured to be fitted together within a range in which the kettle grip part 23 is located between the rib 75 and the wall part 80 in the front-rear direction. Thus, the rib 75 has a positioning function for properly placing the kettle body 10 on the power supply base 70 in cooperation with the wall part 80. Accordingly, the user can easily place the kettle body 10 in a proper position.

Second Embodiment

<Structure of the Power Supply Unit>

An electric kettle 1*a* according to a second embodiment of the present disclosure is described with reference to FIG. 19. In the following description, components identical to those of the above-described embodiment are given the same numerals and not described. In the electric kettle 1*a* of the second embodiment, a control device (unit) 65*a* (CPU) of a power supply unit 50*a* is configured to implement various functions to serve as control part 66*a* by executing programs stored in the memory. The control device 65*a* stores a predetermined relation between amounts of liquid in the kettle body 10 and power required to heat each amount of the liquid up to a predetermined temperature. The control part 66*a* calculates an actual amount of the liquid that can be heated up to the predetermined temperature based on the above-described relation and the residual capacity of the battery pack 100 that is obtained via the mounting unit 90.

A first display part 86*a* displays the liquid amount calculated by the control part 66*a*. An example of the display of the first display part 86*a* is shown in FIG. 19. The amount of liquid that can be contained in the liquid containing part 48 is shown by a scale, and the liquid amount calculated by the control part 66*a* is shown cross-hatched. The electric kettle 1*a* according to this embodiment is otherwise similar to the electric kettle 1 according to the first embodiment and will not be further elaborated here.

<Effects>

According to this embodiment, the user can put the displayed amount of liquid into the kettle body 10 in order to obtain the liquid heated up to the predetermined temperature by putting the displayed amount of liquid into the kettle body 10, for example, even when the residual capacity of the battery pack 100 is small.

The electric kettle 1*a* according to this embodiment has the same structure as the electric kettle 1 according to the first embodiment except for the control part 66*a* and the first display part 86*a*. Therefore, the electric kettle 1*a* according to this embodiment also has the same effects as the effects (A1) to (A19) of the first embodiment.

Third Embodiment

An electric kettle 1*e* according to a third embodiment of the present disclosure is described with reference to FIGS. 20 and 21. The electric kettle 1*e* is different from the electric kettle 1 according to the first embodiment in that a power supply unit 50*e* has a switch S2 and a second display part 150. The switch S2 is an input interface (a manipulation part) for setting a target (desired) temperature of liquid (to be heated) in the kettle body 10 and changing a unit of temperature to be displayed on the second display part 150. The second display part 150 is configured to display (indicate) various kinds of information including the drive information of the electric kettle 1*e*. The other components of the electric kettle 1e according to this embodiment are similar to those of the first embodiment and will not be described here.

Display of the second display part 150, which is shown as an example in FIG. 21, is now described. In the example shown in FIG. 21, a set target temperature of the liquid to be heated in the kettle body 10 is displayed in a region 151 of the second display part 150. The temperature of the liquid in the kettle body 10 is measured by the temperature sensor Tc and displayed in a region 152. The unit of temperature is selected with the switch S2 and displayed in a region 153. The electric kettle 1e is configured such that either centigrade or Fahrenheit can be selected as the temperature unit. Whether the power supply unit 50 is on a plane (flat surface) or not is displayed in a region 154. For example, while the power supply unit 50 remains on the plane (i.e., while the bottom switch 133 is ON), the control part 66 continuously displays (i.e., without blinking) in the region 154 an icon indicating that the power supply unit 50 is on a plane. On the other hand, while the power supply unit 50 is not on a plane (i.e., while the bottom switch 133 is OFF), the control part 66 blinks this icon. Whether the kettle body 10 is on the power supply unit 50 (the power supply base 70) or not is displayed in a region 155. For example, while the kettle body 10 remains on the power supply base 70, the control part 66 continuously displays in the region 155 an icon indicating that the kettle body 10 is on the power supply base 70. On the other hand, while the kettle body 10 is not on the power supply base 70, the control part 66 blinks this icon.

Information relating to the residual capacity of the battery pack 100 is displayed in a region 156. For example, when the residual capacity of the battery pack 100 is less than a predetermined residual capacity, the control part 66 blinks an icon of a battery in the region 156. At this time, the control part 66 may simultaneously cause the sound output part 141 to audibly indicate this information. An icon indicating that the heater 49 is being heated is displayed in a region 157 during power supply to the heater 49. An icon indicating whether output of sound from the sound output part 141 is permitted is displayed in a region 158. A user can manually input with the switch S2 whether to permit output of sound from the sound output part 141.

<Effects>

In the electric kettle 1e according to this embodiment, the second display part 150 visually indicates (displays) whether the power supply unit 50 is on a plane (flat surface) and whether the kettle body 10 is on the power supply base 70. This can further urge the user to place the power supply unit 50 on a plane or to place the kettle body 10 on the power supply base 70. Further, the electric kettle 1e according to this embodiment has the same structure as the electric kettle 1 according to the first embodiment except for having the second display part 150 and the switch S2. Therefore, the electric kettle 1e according to this embodiment also has the same effects as the effects (A1) to (A19) of the first embodiment.

Fourth Embodiment

<Structure of the Power Supply Unit>

An electric kettle 1b according to a fourth embodiment of the present disclosure is described with reference to FIG. 22. The electric kettle 1b is different from the electric kettle 1 according to the first embodiment in that a mounting unit 90b of a power supply unit 50b does not have the slide rails 92. In this embodiment, the mounting unit 90b is configured such that a battery pack 100b is coupled thereto via an electric cord 120b.

Specifically, in this embodiment, the battery pack 100b has a battery body 110b and the electric cord 120b having one end connected to the battery body 110b. The battery body 110b includes a plurality of lithium ion battery cells connected in series. A connection end part 125b is provided on the other end of the electric cord 120b and has an insertion port for connection to the mounting unit 90b. The mounting unit 90b has a mounting part (not shown) configured such that the insertion port of the connection end part 125b is plugged therein. The electric kettle 1b according to this embodiment is otherwise similar to the electric kettle 1 according to the first embodiment and will not be further elaborated here.

<Effects>

According to this embodiment, the electric kettle 1b has the same effects as the effects (A1) to (A11) and (A13) to (A19) of the first embodiment, excluding the effect (A12) relating to the slide rails 92 of the mounting unit 90 in the first embodiment.

Fifth Embodiment

<Structure of the Power Supply Unit>

An electric kettle 1c according to a fifth embodiment of the present disclosure is described with reference to FIG. 23. In FIG. 23, main parts of the electric kettle 1c that are not visible from the outside are shown by broken lines. A power supply unit 50c of the electric kettle 1c mainly includes a base part 60c and a mounting unit 90c. Unlike the electric kettle 1 according to the first embodiment, the power supply unit 50c does not have the wall part 80 and the power supply unit grip part 85. Further, the power supply unit 50c has an acceleration sensor 133c in place of the bottom switch 133. The acceleration sensor 133c detects movement of the power supply unit 50c. In this embodiment, the control part 66 determines that the power supply unit 50c is on a plane (flat surface) when movement of the power supply unit 50c is not detected via the acceleration sensor 133c.

The base part 60c separates a region for a power supply base 70c and a region for the mounting unit 90c. The power supply base 70c is provided on an upper surface 61c side of the base part 60c. The power supply base 70c is a portion of the upper surface 61c of the base part 60c that is recessed downward.

The mounting unit 90c is provided on a lower surface 63c side of the base part 60c. Two mounting parts 91c are arranged in the mounting unit 90c. Each of the mounting parts 91c has a pair of slide rails (not shown). In this embodiment, the slide rails extend in the front-rear direction. The battery pack 100 can be coupled to and removed from the mounting part 91c by sliding the battery pack 100 in the front-rear direction relative to the slide rails. In the electric kettle 1c, a surface of the battery pack 100 (a lower surface of the battery pack 100 in FIG. 23) opposite to a surface thereof having the rail receiving parts 101 (see FIG. 15) can be placed on a table (or a desk), floor or ground. The electric kettle 1c according to this embodiment is otherwise similar to the electric kettle 1 according to the first embodiment and will not be further elaborated here.

<Effects>

In the electric kettle 1c according to the fifth embodiment, the power supply unit 50c has the mounting unit 90c configured such that the battery pack 100 is removably coupled thereto, which facilitates handling of the kettle body 10, compared with a structure in which the battery pack 100 is mounted on the kettle body 10. Therefore, the electric kettle 1c has the same effect as the above-described effect (A1) of the first embodiment.

The power supply unit 50c has the acceleration sensor 133c, so that whether the power supply unit 50c is on a plane (flat surface) can be detected via the acceleration sensor 133c.

The power supply base 70c on which the kettle body 10 is placed is arranged on the first surface (the upper surface 61c) side of the base part 60c, and the mounting unit 90c configured such that the battery pack 100 is mounted thereon is arranged on the second surface (the lower surface 63c) side of the base part 60c. Thus, the possibility that liquid to be used for the electric kettle 1c adheres to the mounting unit 90c can be reduced.

The electric kettle 1c according to the fifth embodiment is otherwise similar to the electric kettle 1 according to the first embodiment, and therefore has the same effect as the effects (A3) to (A9), (A11) and (A14) to (A19) of the first embodiment.

Sixth Embodiment

<Structure of the Power Supply Unit>

An electric kettle 1d according to a sixth embodiment of the present disclosure is described with reference to FIG. 24. In FIG. 24, main parts of the electric kettle 1d that are not visible from the outside are shown by broken lines. A power supply unit 50d of the electric kettle 1d mainly includes a base part 60d, a mounting unit 90d and a power supply unit grip part 85d. Unlike the first embodiment, the power supply unit 50d does not have the wall part 80.

A power supply base 70d is provided on an upper surface 61d side of the base part 60d. The power supply base 70d is a portion of the upper surface 61d of the base part 60d that is recessed downward. The mounting unit 90d is provided on a side surface 62d of the base part 60d. Thus, the electric kettle 1d according to this embodiment is different from the above-described embodiments in that the power supply base 70d is arranged on the first surface (the upper surface 61d) side of the base part 60d and the mounting unit 90d is provided on the side surface 62d of the base part 60d. A second surface (a lower surface 63d) of the base part 60d can be placed on a table (or a desk), floor or ground.

The mounting unit 90d has two mounting parts 91d. The mounting parts 91d are arranged side by side in the front-rear direction, and only one of the mounting parts 91d is shown in FIG. 24. Each of the mounting parts 91d has a pair of slide rails (not shown). The battery pack 100 can be coupled to (mounted onto) the mounting part 91d by sliding the battery pack 100 in the mounting direction relative to the slide rails.

A power supply unit grip part 85d extends upward from the power supply base 70d. An upper end of the power supply unit grip part 85d protrudes above the kettle body 10 placed on the power supply base 70d.

<Effects>

According to this embodiment, the power supply unit 50d has the mounting unit 90d for mounting the battery pack 100 thereon, which facilitates handling of the kettle body 10, compared with a structure in which the battery pack 100 is mounted on the kettle body 10. Therefore, this embodiment also has the same effect as the effect (A1) of the first embodiment.

Further, the power supply unit 50d has the power supply unit grip part 85d, so that the user can hold the power supply unit grip part 85d and carry the power supply unit 50d or carry the kettle body 10 and the power supply unit 50d together.

Correspondences between the features of the above-described embodiments and the features of the present disclosure are as follows, but the features of the embodiments are merely exemplary and the features of the present disclosure are not limited to them.

The electric kettles 1, 1a, 1b, 1c, 1d, 1e are examples of the "electric kettle". The battery packs 100, 100b are examples of the "external power source" and the "battery pack". The power receiving connection part 42 is an example of the "power receiving connection part". The heater 49 is an example of the "heating part". The kettle body 10 is an example of the "kettle body". The power supply units 50, 50a, 50b, 50c, 50d, 50e are examples of the "power supply unit". The power supply bases 70, 70c, 70d are examples of the "power supply base". The upper surface 71 is an example of the "upper surface of the power supply base". The power supply connection part 72 is an example of the "power supply connection part". The mounting units 90, 90b, 90c, 90d are examples of the "mounting unit". The bottom switch 133 is an example of the "first detection part" and the "switch". The acceleration sensor 133c is an example of the "first detection part". The first energizing terminal 131, the second energizing terminal 132, the temperature sensor Tc and the acceleration sensor 133c are examples of the "second detection part". The control parts 66, 66a are examples of the "first control part" and the "second control part". The first display parts 86, 86a, the second display part 150, the sound output part 141, the main switch S1 and the switch S2 are examples of the "indication part". The power supply unit grip parts 85, 85d are examples of the "grip part". The front surface 81 is an example of the "first surface". The rear surface 82 is an example of the "second surface".

OTHER EMBODIMENTS

The detection part for detecting whether the power supply unit 50, 50a, 50b, 50c, 50d, 50e is on a plane (flat surface) is not limited to the bottom switch 133 and the acceleration sensor 133c. For example, a device for detecting movement or tilting of the power supply unit 50, 50a, 50b, 50c, 50d, 50e, including a gyro sensor, a tilt sensor and other vibration detection sensors, can be employed.

In the above-described embodiments, whether the kettle body 10 is on the power supply base 70, 70c, 70d is detected by the first and second energizing terminals 131, 132 respectively provided in the upper surface 71 of the power supply base 70, 70c, 70d and the lower surface 41 of the kettle body 10, and the temperature sensor Tc. However, other sensors or devices such as a switch that is capable of detecting whether the kettle body 10 is on the power supply base 70, 70c, 70d may be used. For example, a push-in type switch like the bottom switch 133 may be provided in the lower surface 41 of the kettle body 10 and configured such that an ON signal is transmitted from the kettle body 10 to the power supply unit 50, 50a, 50b, 50c, 50d, 50e when this switch is pushed.

In the above-described embodiments, the control part 66, 66a executes power supply to the heater 49 when the predetermined conditions are satisfied. The predetermined conditions include (i) that the power supply unit 50, 50a, 50b, 50c, 50d, 50e is on a plane, (ii) that the kettle body 10 is on the power supply base 70, 70c, 70d, and (iii) that the residual capacity of the battery pack 100, 100b is a predetermined residual capacity or more. The predetermined conditions may however be at least any one of the above-described conditions (i), (ii), (iii), or that the main switch S1 is turned ON.

The structure of the electric kettle 1, 1a, 1b, 1c, 1d, 1e may be appropriately changed. For example, the power supply base 70 need not have the inclined surface 74. The power supply connection part 72 and the power receiving connection part 42 may have other shapes insofar as these parts are configured to be electrically connected to each other when the kettle body 10 is on the power supply base 70.

In the above-described embodiments, the kettle body 10 may be, for example, a kettle that is configured to be placed on a commercial power supply unit connected to an AC power source.

The through holes 77, if provided in the power supply base 70, 70c, 70d, may be closer to the power supply connection part 72 than to the outer edge of the power supply base 70, 70c, 70d. This structure can also reduce the possibility that liquid to be used for the kettle body 10 stays on the power supply base 70, 70c, 70d.

The control device 65, 65a may be provided in the kettle body 10. In this case, the kettle body 10 may be configured to obtain the residual capacity of the battery pack 100 and the set temperature via the power supply connection part 72 and the power receiving connection part 42 that are provided in the kettle body 10. Like the control device 65, 65a, the first display part 86, 86a, the second display part 150, the sound output part 141, the main switch S1 and the switch S2 may also be provided in the kettle body 10.

The power supply unit 50 may be configured to include the mounting unit 90b of the fourth embodiment. Specifically, the mounting unit 90 of the power supply unit 50 may be configured such that the battery pack 100 and the battery pack 100b are selectively removably mounted thereto.

The electric kettle 1, 1a, 1b, 1c, 1d, 1e may have a charging function. For example, the electric kettle 1, 1a, 1b, 1c, 1d, 1e may have a connection part configured to be connected to an AC power source and be configured to charge the battery pack 100, 100b when the AC power source is connected to the connection part. The base part 60, 60c, 60d may have a charging circuit for this charging, or a unit having a charging circuit may be provided in the middle of a cord for the AC power source.

The electric kettle 1, 1a, 1b, 1c, 1d, 1e may be configured to wirelessly communicate with an external device, and various settings for the electric kettle 1, 1a, 1b, 1c, 1d, 1e may be performed with the external device. For example, a portable terminal may be used which is capable of wireless communication and is provided with applications for driving the electric kettle 1, 1a, 1b, 1c, 1d, 1e and performing the various settings such as temperature setting, and the control part 66, 66a of the electric kettle 1, 1a, 1b, 1c, 1d, 1e may perform various controls according to instructions via the applications. Further, the control part 66, 66a may transmit the various settings (performed for the electric kettle 1, 1a, 1b, 1c, 1d by the user) and use history information of the electric kettle to the portable terminal via a communication part provided in the electric kettle 1, 1a, 1b, 1c, 1d. For example, the control part 66, 66a may be configured to obtain signals from the main switch S1, the bottom switch 133, the acceleration sensor 133c, the first energizing terminals 131, the second energizing terminals 132 and the temperature sensor Tc, and transmit to the portable terminal, information that the main switch S1 of the electric kettle 1, 1a, 1b, 1c, 1d, 1e has been turned ON, that the kettle body 10 has been lifted up from the power supply base 70, 70c, 70d, or that the power supply unit 50, 50a, 50b, 50c, 50d, 50e has been moved away from the plane, if such is detected from the obtained signals.

The electric kettle 1, 1a, 1b, 1c, 1d, 1e may have a detection part provided in the kettle body 10 to detect that the kettle body 10 is on a plane (flat surface), and may be further configured to detect based on the detection result of this detection part that the whole electric kettle 1, 1a, 1b, 1c, 1d, 1e is on a plane. For example, like the detection device provided in the power supply unit 50, 50a, 50b, 50c, 50d, 50e to detect that the power supply unit is on a plane, the kettle body 10 may have a device for detecting movement or tilting of the kettle body 10 (the electric kettle 1, 1a, 1b, 1c, 1d, 1e), including an acceleration sensor, a gyro sensor, a tilt sensor and other vibration detection sensors. Such a structure may be applied to detect whether the electric kettle 1, 1a, 1b, 1c, 1d, 1e is on a plane.

Further, in view of the nature of the present disclosure and the above-described embodiments, the following aspects are provided. At least one of the aspects can be employed in combination with any of the above-described embodiments and the claimed invention.

(Aspect 1)

An electric kettle, comprising:
  a kettle body having a power receiving connection part configured to receive power from an external power source, and a heating part configured to heat liquid contained in the kettle body by the power the power receiving connection part receives; and
  a power supply unit configured such that the kettle body is placed thereon, and configured to supply power to the kettle body,
  the power supply unit including:
    a plate part having a first surface and a second surface;
    a power supply base that is arranged on a side of the first surface of the plate part and configured such that the kettle body is placed on top thereof, the power supply base having a power supply connection part that is configured to be electrically removably connected to the power receiving connection part; and
    a mounting unit that is arranged on a side of the second surface of the plate part and configured such that a battery pack is removably coupled thereto as the external power source for supplying power to the heating part via the power supply connection part and the power receiving connection part.

(Aspect 2)

The plate part is connected to the power supply base and extends upward from the power supply base, and
  the mounting unit is arranged on the second surface of the plate part.

(Aspect 3)

The mounting unit has a rail that extends in an up-down direction and that is configured such that the battery pack is removably coupled thereto by sliding in the up-down direction.

(Aspect 4)

The plate part has a grip part that is provided above the mounting unit and configured to be held by a user.

(Aspect 5)

The power supply unit has a rib protruding upward from the power supply base and facing the first surface of the plate part.

(Aspect 6)

The power supply base has a through hole formed through the power supply base in the up-down direction.

(Aspect 7)

The power supply connection part is arranged on a central portion of an upper surface of the power supply base, the upper surface includes an inclined surface inclined downward from the central portion toward an outer edge of the power supply base, and the through hole is closer to the outer edge of the power supply base than to the central portion.

(Aspect 8)

The plate part has a recessed part formed in the first surface and recessed from the first surface toward the second surface of the plate part, the recessed part being shaped to conform to a side peripheral surface of the kettle body placed on the power supply base.

(Aspect 9)

The electric kettle further comprises:

a control part that is configured to calculate an amount of liquid that can be heated up to a predetermined temperature based on (i) a predetermined relation between amounts of the liquid in the kettle body and power required to heat each amount of the liquid up to the predetermined temperature and (ii) a residual capacity of the battery pack that is obtained via the mounting unit, and a display part that is provided on the power supply unit and configured to display the amount of the liquid calculated by the control part.

(Aspect 10)

The power receiving connection part of the kettle body and the power supply connection part of the power supply base are configured to be fitted together when the kettle body is placed on the power supply base and to restrict rotation of the kettle body on the power supply base.

(Aspect 11)

An electric kettle, comprising:

a kettle body having a power receiving connection part configured to receive power from an external power source, and a heating part configured to heat liquid contained in the kettle body by the power the power receiving connection part receives; and a power supply unit configured such that the kettle body is placed thereon, and configured to supply power to the kettle body, the power supply unit including:

a power supply base configured such that the kettle body is placed on top thereof, and having a power supply connection part that is configured to be electrically removably connected to the power receiving connection part; and a mounting unit that is configured such that a battery pack is removably coupled thereto as the external power source for supplying power to the heating part via the power supply connection part and the power receiving connection part; and a grip part that extends upward from the power supply base and is configured to be held by a user.

(Aspect 12)

The mounting unit is arranged in a position opposed to the kettle body placed on the power supply base across the grip part.

(Aspect 13)

The kettle body has a temperature sensor configured to measure a temperature of liquid contained in the kettle body, and the second detection part includes a first energizing terminal provided in the upper surface of the power supply base and a second energizing terminal provided in the lower surface of the kettle body, and the first energizing terminal and the second energizing terminal are arranged to be connected to each other when the kettle body is on the power supply base, and configured to form (activate, work, complete, close) an electronic circuit for the temperature sensor by the connection to each other.

(Aspect 14)

A power supply unit that is configured such that a kettle body is placed thereon, and configured to supply power to the kettle body, the kettle body having a power receiving connection part configured to receive power from an external power source, and a heating part configured to heat liquid contained in the kettle body by the power the power receiving connection part receives, the power supply unit comprising:

a plate part having a first surface and a second surface;

a power supply base that is arranged on a side of the first surface of the plate part and configured such that the kettle body is placed on top thereof, the power supply base having a power supply connection part that is configured to be electrically removably connected to the power receiving connection part; and a mounting unit that is arranged on a side of the second surface of the plate part and configured such that a battery pack is removably coupled thereto as the external power source for supplying power to the heating part via the power supply connection part and the power receiving connection part.

In the foregoing embodiments, parts or all of the functions and processing implemented by software may be implemented by hardware. In addition, parts or all of the functions and process implemented by hardware may be implemented by software. As the hardware, for example, various circuits, such as an integrated circuit, a discrete circuit, or a combined circuit module thereof can be used.

DESCRIPTION OF THE REFERENCE NUMERALS 1, 1a, 1b, 1c, 1d, 1e . . . electric kettle, 10 . . . kettle body, 20 . . . body unit, 21 . . . lid, 22 . . . spout, 23 . . . kettle grip part, 30 . . . side wall part, 31 . . . outer peripheral surface, 40 . . . bottom part, 41 . . . lower surface, 42 . . . power receiving connection part, 42s . . . side face, 44 . . . plate-like member, 44s . . . face, 45 . . . power receiving connection terminal, 46 . . . inclined face, 48 . . . liquid containing part, 49 . . . heater, 50, 50a, 50b, 50c, 50d, 50e . . . power supply unit, 60, 60c, 60d . . . base part, 61c, 61d . . . upper surface, 62 . . . side wall, 63, 63c, 63d . . . lower surface, 65, 65a . . . control device, 66, 66a . . . control part, 67 . . . temperature setting part, 70, 70c, 70d . . . power supply base, 71 . . . upper surface, 72 . . . power supply connection part, 72s . . . side face, 72u . . . upper face, 73 . . . power supply connection terminal, 74 . . . inclined surface, 75 . . . rib, 77 . . . through hole, 79 . . . notch, 79c . . . face, 79g . . . inclined face, 79s . . . face, 80 . . . wall part, 81 . . . front surface, 82 . . . rear surface, 83 . . . recessed part, 85, 85d . . . power supply unit grip part, 86, 86a . . . first display part, 90, 90b, 90c, 90d . . . mounting unit, 91, 91c, 91d . . . mounting part, 92 . . . slide rail, 93 . . . positive input terminal, 94 . . . negative input terminal, 95 . . . lock receiving hole, 100, 100b . . . battery pack, 101 . . . rail receiving part, 102 . . . positive output terminal, 103 . . . negative output terminal, 104 . . .

connector part, 105 . . . lock member, 106 . . . unlock button, 110*b* . . . battery body, 120*b* . . . electric cord, 125*b* . . . connection end part, 131 . . . first energizing terminal, 132 . . . second energizing terminal, 133 . . . bottom switch, 133*c* . . . acceleration sensor, 134 . . . button, 135 . . . button receiver, 141 . . . sound output part, 150 . . . second display part, 151, 152, 153, 154, 155, 156, 157, 158 . . . region, S1 . . . main switch, S2 . . . switch, Tc . . . temperature sensor

The invention claimed is:

1. An electric kettle, comprising:
a kettle body having a power receiving connection part configured to receive power from an external power source, and a heating part configured to heat liquid contained in the
a power supply unit configured such that the kettle body is placed thereon, and configured to supply power to the kettle body,
the power supply unit including:
a power supply base configured such that the kettle body is placed on top thereof, the power supply base including a power supply connection part that is configured to be electrically removably connected to the power receiving connection part;
a mounting unit configured such that a battery pack is removably coupled thereto as the external power source for supplying power to the heating part via the power supply connection part and the power receiving connection part; and
a first sensor configured to detect that the power supply unit is placed on a plane, wherein:
an indicator configured to indicate drive information of the electric kettle; and
a second controller configured to control the indicator based on a detection result of the first sensor, wherein:
the second controller is configured to cause the indicator to indicate, as the drive information that the power supply unit is not on the plane when the power supply unit is not placed on the plane.

2. The electric kettle as defined in claim 1, wherein the first sensor includes a switch provided in a lower surface of the power supply unit, and
the switch is configured to protrude from the lower surface when the power supply unit is not on the plane, while being pushed into the lower surface when the power supply unit is on the plane.

3. The electric kettle as defined in claim 1, further comprising:
a first controller that is configured to control power supply to the heating part via the power supply connection part and the power receiving connection part based on a detection result of the first sensor, wherein:
the first controller supplies power supply to the heating part when at least one predetermined condition is satisfied, and does not supply power to the heating part when the at least one predetermined condition is not satisfied, and
the at least one predetermined condition includes that the power supply unit is placed on the plane.

4. The electric kettle as defined in claim 3, further comprising a second sensor configured to detect that the kettle body is on the power supply base.

5. The electric kettle as defined in claim 4, wherein:
the first controller is further configured to control power supply to the heating part based on a detection result of the second sensor,
the at least one predetermined condition includes that the kettle body is on the power supply base.

6. The electric kettle as defined in claim 5, wherein the second controller is further configured to control the indicator based on a detection result of the second sensor, and to cause the indicator to indicate, as the drive information, that the kettle body is not on the power supply base when the kettle body is not on the power supply base.

7. The electric kettle as defined in claim 6, wherein:
the first sensor includes a switch, the switch being provided in a lower surface of the power supply unit, and configured to protrude from the lower surface when the power supply unit is not on the plane, while being pushed into the lower surface when the power supply unit is on the plane, and
the second controller is further configured to detect a residual capacity of the battery pack via the mounting unit and to cause the indicator to indicate, as the drive information, that the residual capacity of the battery pack is not more than a predetermined residual capacity when the residual capacity of the battery pack is not more than the predetermined residual capacity.

8. The electric kettle as defined in claim 1, further comprising a second sensor configured to detect that the kettle body is on the power supply base.

9. The electric kettle as defined in claim 3, further comprising:
a second sensor configured to detect that the kettle body is on the power supply base, wherein:
the first controller is further configured to control power supply to the heating part based on a detection result of the second sensor, and
the at least one predetermined condition includes that the kettle body is placed on the power supply base.

10. The electric kettle as defined in claim 1, further comprising:
a second sensor configured to detect that the kettle body is on the power supply base, wherein:
the second controller is further configured to control the indicator based on a detection result of the second sensor, and to cause the indicator to indicate, as the drive information that the kettle body is not on the power supply base when the kettle body is not placed on the power supply base.

11. The electric kettle as defined in claim 1, wherein the second controller is further configured to detect a residual capacity of the battery pack via the mounting unit and to cause the indicator, as the drive information, that the residual capacity of the battery pack is not more than a predetermined residual capacity when the residual capacity of the battery pack is not more than the predetermined residual capacity.

12. The electric kettle as defined in claim 1, wherein the power supply unit has a grip part that extends upward from the power supply base and is configured to be held by a user.

13. The electric kettle as defined in claim 12, wherein the power supply base and the mounting unit are respectively arranged on opposite sides of the grip part.

14. The electric kettle according to claim 1, wherein the indicator includes at least one of a first display part, a second display part, a sound output, a first switch and a second switch.

15. A power supply unit, which is configured such that a kettle body is placed thereon, and configured to supply power to the kettle body, comprising:
a power supply base configured such that the kettle body is placed on top thereof, the power supply base including a power supply connection part that is configured to supply power to the kettle body;

a mounting unit that is configured such that a battery pack is removably coupled thereto to supply power to the kettle body via the power supply connection part;

a first sensor configured to detect that the power supply unit is on a plane;

an indicator configured to indicate drive information of an electric kettle; and a second controller configured to control the indicator based on a detection result of the first sensor, wherein:
the second controller is configured to cause the indicator to indicate, as the drive information that the power supply unit is not on the plane when the power supply unit is not placed on the plane.

16. An electric kettle, comprising:

a kettle body having a power receiving connection part configured to receive power from an external power source, and a heating part configured to heat liquid contained in the kettle body by the power the power receiving connection part receives; and a power supply unit configured such that the kettle body is placed thereon, and configured to supply power to the kettle body, the power supply unit including:
a power supply base configured such that the kettle body is placed on top thereof, the power supply base including a power supply connection part that is configured to be electrically removably connected to the power receiving connection part;

a mounting unit configured such that a battery pack is removably coupled thereto as the external power source for supplying power to the heating part via the power supply connection part and the power receiving connection part; and a sensor configured to detect that the power supply unit is placed on a plane, wherein:
the sensor includes a switch provided in a lower surface of the power supply unit, and
the switch is configured to protrude from the lower surface when the power supply unit is not on the plane, while being pushed into the lower surface when the power supply unit is on the plane.

17. The electric kettle according to claim 16, further comprising:

a first controller that is configured to control power supply to the heating part via the power supply connection part and the power receiving connection part based on a detection result of the sensor, wherein:
the first controller supplies power supply to the heating part when at least one predetermined condition is satisfied, and does not supply power to the heating part when the at least one predetermined condition is not satisfied, and
the at least one predetermined condition includes that the power supply unit is placed on the plane.

* * * * *